(12) United States Patent
Ford et al.

(10) Patent No.: US 7,854,914 B2
(45) Date of Patent: Dec. 21, 2010

(54) SOLUBLE CARBON NANOTUBES

(75) Inventors: William E. Ford, Stuttgart (DE); Jurina Wessels, Stuttgart (DE); Akio Yasuda, Esslingen (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 12/404,095

(22) Filed: Mar. 13, 2009

(65) Prior Publication Data

US 2009/0178559 A1 Jul. 16, 2009

Related U.S. Application Data

(62) Division of application No. 10/538,300, filed as application No. PCT/EP03/10600 on Sep. 23, 2003, now Pat. No. 7,531,157.

(30) Foreign Application Priority Data

Dec. 12, 2002 (EP) .................. 02027863

(51) Int. Cl.
 *D01F 9/12* (2006.01)
 *C09C 1/56* (2006.01)
(52) U.S. Cl. .............. 423/447.2; 977/745; 977/746; 977/748; 423/447.1; 423/460; 428/403; 428/407; 428/408
(58) Field of Classification Search ................ 428/403, 428/407, 408; 423/447.1, 460, 447.2; 977/745, 977/746, 748
See application file for complete search history.

(56) References Cited

U.S. PATENT DOCUMENTS 6,159,742 A 12/2000 Lieber et al.

6,368,569 B1 4/2002 Haddon et al.
6,426,134 B1 7/2002 Lavin et al.
2002/0137871 A1 9/2002 Wheeler, Jr. et al.
2002/0161101 A1 10/2002 Carroll et al.

FOREIGN PATENT DOCUMENTS

| EP | 0 716 044 | 6/1996 |
| WO | WO 01/10779 | 2/2001 |
| WO | WO 02/076888 | 10/2002 |
| WO | WO 03/038837 | 5/2003 |

OTHER PUBLICATIONS

Xie, Jining et al., Ultraviolet-curable polymers with chemically bonded carbon nanotubes for microelectromechanical system applications, 2002, Smart Materials and Structures, 11, pp. 575-580.*
Hirsch, Andreas: "Functionalization of Single-Walled Carbon Nanotubes", Angew.Chem.Int.Ed., vol. 41, No. 11, Jun. 3, 2002, pp. 1853-1859, XP002241543.
Van Steen Eric et al: "Comparison of preparation methods for carbon nanotubes supported iron Fischer-Tropsch catalysts" Fischer-Tropsch Synthesis on the Eve of the XXI Century (CATSA); Kruger Park, South Africa Nov. 1, 2000, vol. 71, No. 3-4, Nov. 1, 2000, pp. 327-334, XP002280026.
Georgakilas, Vasilios et al., Organic Functionalization of Carbon Nanotubes, Jan. 8, 2002, J. Am. Chem. Soc., vol. 124, No. 5, pp. 760-761.

* cited by examiner

*Primary Examiner*—Melvin C Mayes
*Assistant Examiner*—Kevin M Johnson
(74) *Attorney, Agent, or Firm*—Oblon, Spivak, McClelland, Maier & Neustadt, L.L.P.

(57) ABSTRACT

The present invention relates to a method of solubilizing carbon nanotubes, to carbon nanotubes produced thereby and to uses of said carbon nanotubes.

9 Claims, 11 Drawing Sheets

Figure 1:
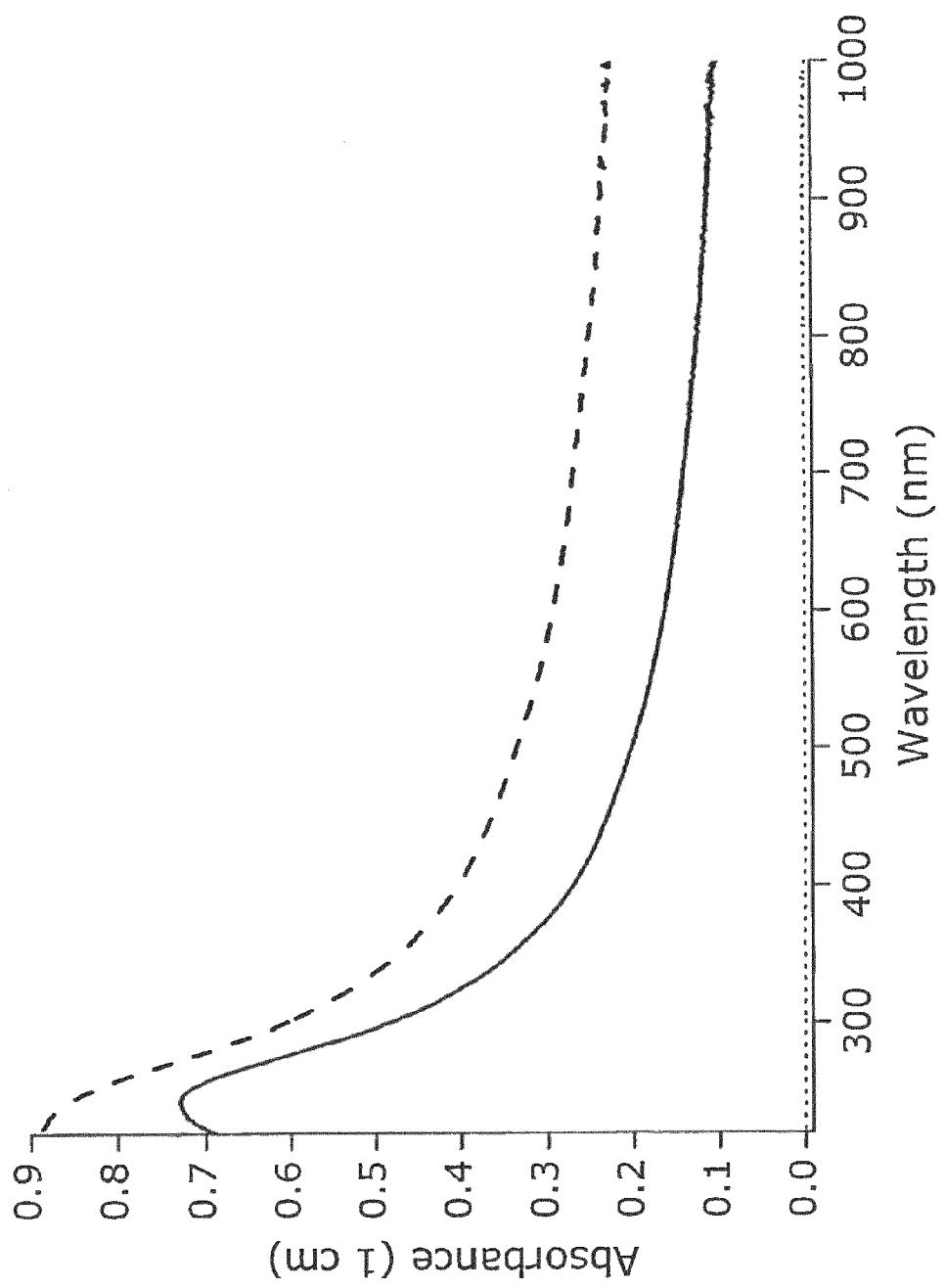

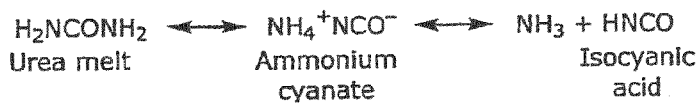
Reactions involving carboxylic acid groups
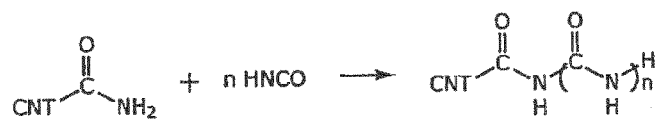
Reactions involving phenol groups
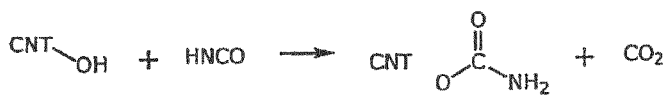
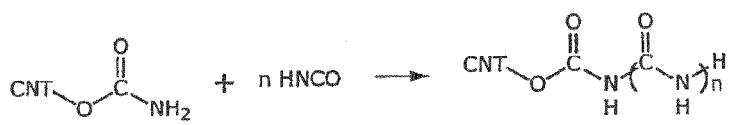
Reactions involving epoxide groups
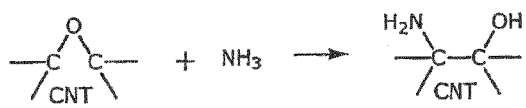
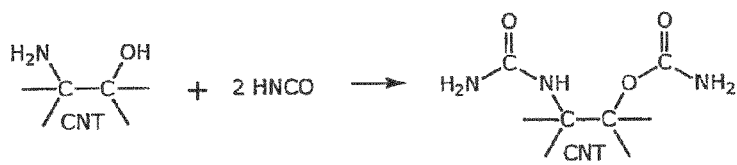
Figure 3

SOLUBLE CARBON NANOTUBES

This application is a divisional of U.S. Ser. No. 10/538,300 filed Jun. 10, 2005 and issued as U.S. Pat. No. 7,531,157 on May 12, 2009, the entire contents of this application is incorporated herein by reference. U.S. Ser. No. 10/538,300 is a National Stage of PCT/EP03/10600 filed Sep. 23, 2003, and claims the benefit of priority of European Application No. 02027863.6 filed Dec. 12, 2002.

Carbon nanotubes (CNTs) have recently attracted considerable attention due to their unique electronic, mechanical and structural properties. Carbon nanotubes have been shown to be electrically conducting at the same time as having high tensile strength and elasticity, the ability to absorb gas molecules as nanocapillaries, the potential of further chemical functionalization, and chemical and thermostability. These qualities make carbon nanotubes prime candidates for use in nanomolecular and/or electronic devices.

Carbon nanotubes can be synthesized by a range of methods of which involve the vaporization of elementary carbon by various means. The first synthesis reported took place by the discharge of an electric arc of graphite in the presence of metal catalysts (e.g. Fe, Co, Ni). Alternative routes are based on the laser vaporization of graphite-Ni—Co-mixtures or chemical vapor deposition wherein various carbon sources can be used. At present milligram to gram quantities can currently be manufactured by using such routes, within a matter of hours. The material, thus produced, however, has a substantial amount of contaminants and, in addition, sidewall defects. Carbon nanotubes which result directly from such synthesis methods, without having been further modified, are commonly referred to as "as-prepared carbon nanotubes". In order to remove the contaminants, mainly oxidative treatments have been imployed.

As-prepared carbon nanotubes (CNTs) that are produced in bulk quantities (usually via chemical vapor deposition, electric arc discharge, laser ablation (also known as pulsed laser vaporization), or gas-phase catalytic growth) are generally contaminated with large amounts of impurities (typically 5-50 wt %). The impurities include amorphous carbon, graphite encapsulated catalytic metal particles, graphitic material, and fullerenes. The most common methods for purifying the CNTs involve either liquid-phase or gas-phase oxidation processes, which may be accompanied by solvent extraction, ultra-sonication, centrifugation, filtration, chromatography, and/or microwave exposure. The liquid-phase oxidation processes generally make use of strong adds (primarily $HNO_3$, $H_2SO_4$, and/or HCl), sometimes with additional oxidants (e.g., $H_2O_2$, $KMnO_4$, etc.). Likewise, gas-phase oxidation is sometimes used in conjunction with liquid-phase add treatment, the latter being necessary for dissolution and removal of metal contaminants. Various reaction parameters such as concentration, temperature, and time have been employed, some representative examples of which are provided in Table 1.

TABLE 1

Published methods for purifying single-walled CNTs (processes conducted at room temperature unless otherwise noted; aqueous solutions unless otherwise noted; filtration/rinsing and drying steps are omitted in most cases).

| CNT production method | Purification steps | Reference |
|---|---|---|
| Electric arc | 1. Reflux in H,O, 12 h<br>2. Extract with toluene<br>4. Bake in air at 470° C., 20 min<br>5. Extract with 6 M HCl | Tohji et al. (1997)[1] |
| Laser ablation | 1. Extract with $CS_2$<br>2. Sonicate in 0.1% surfactant solution, 2 h<br>4. Microfiltration (3 cycles)<br>5. Soak in ethanol (to remove surfactant) | Bandow et al. (1997)[2] |
| Laser ablation | 1. Reflux in concentrated $HNO_3$, 4 h<br>2. Centrifugation, $H_2O$ wash | Dujardin et al. (1998)[3] |
| Laser ablation | 1. Reflux in 2.6 M $HNO_3$, 45 h<br>2. Centrifugation, $H_2O$ wash<br>3. Tangential flow filtration<br>4. Sonicate in 3:1 $H_2SO_4/HNO_3$, 24 h<br>5. Treat with 4:1 $H_2SO_4/30\%$ $H_2O_2$ at 70° C., 0.5 h | Liu et al. (1998)[4] |
| Laser ablation<br>Electric arc | 1. Treat with $Cl_2$ + $H_2O$ at 500° C., 6 h<br>2. Sonicate in 1:1 DMF: 0.6 M HCl<br>3. Sonicate in DMF | Zimmerman et al. (2000)[5] |
| Laser ablation | 1. Reflux in 20% $H_2O_2$, 12 h<br>2. Extract with $CS_2$ and $CH_3OH$ | Tang et al. (2000)[6] |
| Electric arc | 1. Bake in air at 300° C., 24 h<br>2. Treat with conc. $HNO_3$ at 60° C. for 12 h<br>3. Sonicate in ethanol and filter (0.3 pm) | Rao and Govindaraj (2001)[7] |
| Laser ablation | 1. Sonicate in 1:1 $HF/HNO_3$ + surfactant, 5 h.<br>2. Rinse with 0.01 M NaOH | Chattopadhyay et al. (2002)[8] |
| Electric arc | 1. Treat with microwaves (150 W) at 500° C., 20 min<br>2. Reflux in 4MH < 1.6 h | Harutyunyan et al. (2002)[9] |
| Electric arc | 1. Reflux in 2.8 M $HNO_3$, 6 h<br>2. Dry at 100° C., $\geq$10 h<br>4. Bake in air at 550° C., 10 min<br>5. Bake in vacuum at 1600° C., 3 h | Kajiura et al. (2002)[10] |

The more oxidative processes probably result in opening of the ends and enlarging the sidewall defects. As a result, the ends and surfaces of the CNTs can become covered with oxygen-containing groups such as carboxylic acid, ether, phenolic, and quinone groups. Heating in a vacuum to 230-330° C. thermally destroys carboxylic acid groups on single walled CNTs, while heating to 800° C. destroys ether and quinone groups. Rao and Govindaraj subjected their purified CNTs to heat-treatment at 400° C. for 0.5 h to remove acid sites on the surface of the tubes and open them. (Rao et al. (2001) *Proc. Indian Acad. Sci. (Chem. Sci.)* 113, 375). Cai et al. ((2002) *Chem. Mater.* 14, 4235) found that oxygenated functional groups can be removed from single-walled CNTs by heating at 600-800° C. for 5 h. Thermal annealing in vacuum at 1000-1200° C. is expected to cause the open ends to close to hemifullerene end caps. (Liu et al. (1998) *Science* 280, 1253.)

At present there is one drawback associated with carbon nanotubes which prevents them from being properly processed and further manipulated, which is that carbon nanotubes, inherently, are largely insoluble in most common solvents.

This intrinsic insolubility arises from strong van der Waals and $\pi$-$\pi$ stacking interactions between individual CNTs, which causes them to orient parallel to one another in a close-packed triangular lattice. These structures are referred to as "ropes" or "bundles." CNTs that have been subjected to oxidative treatment may have an even greater tendency to form bundles due to carboxyl related secondary bonding forces. Methods that have been developed for enhancing the solubility of CNTs include cutting them into shorter pieces and functionalization. It should be noted that stable dispersions rather than true solutions of CNTs are obtained by some of these methods.

Cutting or shortening of CNTs can be achieved by either mechanical or chemical means. The mechanical methods used include ultrasonication, ball milling, and abrasion. Liu et al. ((1998) *Science* 280, 1253), combined ultrasonication with chemical "etching" for cutting single-walled CNTs.

Hirsch ((2002) *Angew. Chem. Int. Ed.* 41, 1853) recently reviewed the functionalization of single walled CNTs. There is special interest in water-soluble CNTs for biological applications.

Functionalization of CNTs can be classified as either covalent or non-covalent. Several covalent processes utilize the carboxylic acid (—COOH) group that is generated during oxidative purification for attaching organic amines or alcohols to the CNTs via amide or ester bond formation, respectively. The organic compounds attached included polymers and dendrons. Metal complexes can be attached to single-walled CNTs by coordinative bonding of the metal center to the oxygenated carbon groups. Other covalent modifications described in the literature include reversible sidewall-alkylation of fluorinated CNTs (Boul et al. (1999) *Chem. Phys. Lett.* 310, 367), reactions with aryl diazonium compounds (Bahr et al. (2001) *J. Am. Chem. Soc.* 123, 6536; Bahr et al. (2001) *Chem. Mater.* 13, 3823; Kooi et al. (2002) *Angew. Chem. Int. Ed.* 41, 1353), ultrasonically-induced reactions with monochlorobenzene and poly(methyl methacrylate) (Koshio et al. (2001) *Nano Lett.* 1, 361), addition reactions of nitrenes and nucleophilic carbenes (Holzinger et al. (2001) *Angew. Chem. Int. Ed.* 40, 4002), and addition reactions of azomethine ylides (Georgakilas et al. (2002) *J. Am. Chem. Soc.* 124, 760).

Non-covalent processes for functionalization of CNTs generally involve adsorption of molecules to the sidewalls. Surfactants used for this purpose include sodium dodecyl sulfate (Duesberg et al. (1998) *Appl. Phys. A* 67, 117; Doom et al. (2002) *J. Am. Chem. Soc.* 124, 3169) and Triton. The alcohol moiety on Triton surfactants can be used for subsequent covalent chemical modification (Shim et al. (2002) *Nano Lett.* 2, 285). Polymers can adsorb by a process called "polymer wrapping" (Curran et al. (1998) *Adv. Mater.* 10, 1091; Tang et al. (1999) *Macromolecules* 32, 2569; Coleman et al. (2000) *Adv. Mater.* 12, 213; O'Connell et al. (2001) *Chem. Phys. Lett.* 342, 265; Bandyopadhyaya et al. (2002) *Nano Lett.* 2, 25; Star et al. (2002) *Angew. Chem. Int. Ed.* 41, 2508; Chen et al. (2002) *J. Am. Chem. Soc.* 124, 9034; Star et al. (2002) *Macromolecules* 35, 7516). Salt formation between organic amines and the carboxylic acid groups on oxidized CNTs is another non-covalent method for making CNTs soluble (Hamon et al. (1999) *Adv. Mater.* 11, 834; Chen et al. (2001) *J. Phys. Chem.* 105, 2525; Chattopadhyay et al. (2002) *J. Am. Chem. Soc.* 124, 728; Kahn et al. (In press) *Nano Lett*). Lastly, adsorption of pyrene derivatives to the sidewalls of CNTs via $\pi$-stacking interactions was used for functionalization. The succinimidyl ester of 1-pyrenebutanoic acid served as a chemically reactive site for forming attaching proteins to the CNTs via amide bond formation (Chen et al. (2001) *J. Am. Chem. Soc.* 123, 3838).

Despite the above-mentioned cutting and functionalization processes, the carbon nanotubes still exist predominantly in the form of bundles, i.e. agglomerates of carbon nanotubes in parallel. In the past, several attempts have been made to separate these bundles into single (in the sense "non-bundled") carbon nanotubes via a process referred to as "exfoliation".

Treatment of bundles of single-walled CNTs with 70% nitric acid at 25° C. for 2 hours resulted in an expansion of the inter-nanotube spacing and increase in the amount of hydrogen in the material (Bower et al. (1998) *Chem. Phys. Lett.* 288, 481). These changes, which could be reversed by heating to 230° C. under vacuum for 12 hours, indicated reversible intercalation of the bundles with $HNO_3$ molecules. Treatment with the acid for 12 hours resulted in a change in structure and morphology of the CNTs that was not reversed by heating under vacuum. Liu et al. ((1998) *Science* 280, 1253) chose a 3:1 concentrated $H_2SO_4$:$HNO_3$ mixture for the oxidizing acid during cutting of CNTs because it was known to intercalate and exfoliate graphite.

Exfoliation is also believed to be a key feature of the mechanical cutting process reported by Chen et al. ((2001) *J. Am Chem. Soc.* 123, 6201) which involved grinding single-walled CNTs in soft organic materials such as $\gamma$- and $\beta$-cyclodextrins. According to the authors, the excellent dispersion of the CNTs by the cyclodextrins, together with partial exfoliation, made the grinding forces sufficiently strong to induce local conformational strains on the nanotubes, which eventually resulted in cutting, most likely at their defective sites.

Filtration is a method of collecting and washing carbon nanotubes following wet chemical treatments that is widely used in the art. Membrane filters, in particular, are generally used. Some examples are: polycarbonate track-etched filter membrane with 0.8 μm pore size (Shelimov et al. (1998) *Chem. Phys. Lett.* 282, 429), PTFE filter membrane with 0.2 μm pore size (Mickelson et al. (1999) *J. Phys. Chem. B* 103, 4318; Star et al. (2002) *Angew. Chem. Int. Ed.* 41, 2508)), and polycarbonate filter membrane with 3 μm pore size (Yu and Brus (2001) *J. Phys. Chem. B* 105, 1123).

The methods presently known for solubilization are generally very time-consuming and/or require special equipment or chemicals and/or are not easily scaled up to large quantity. Furthermore, they may require the use of CNTs that have been shortened. Accordingly there is a need in the art for simpler solubilization methods that provide soluble carbon nanotubes capable of dissolving in a variety of solvents, including water. Furthermore there is a need in the art for providing a method of solubilizing carbon nanotubes that have not been shortened and/or provide functional groups for subsequent further chemical modification. Also there is a need in the art for a method of solubilizing carbon nanotubes that are applicable to both multi-walled and single-wailed carbon nanotubes that also allow the solubilization of gram quantities of carbon nanotubes.

All these objects are solved by a method of solubilizing carbon nanotubes comprising the steps:
a) providing, in any order:
  carbon nanotubes, and
  at least one type of monomer molecules capable of undergoing a polymerization reaction or a precursor of the at least one type of monomer molecules;
b) mixing together the nano tubes with the monomer molecules or their precursor;
c) initiating a polymerization reaction of the monomer molecules
to yield modified carbon nanotubes, wherein the carbon nanotubes have functional groups on their surface and/or ends, and wherein said polymerization reaction occurs at said functional groups.

"Solubilizing" is not restricted to a particular kind of solvent. Preferably it means solubilizing in aqueous solution or an alcoholic solution, more preferably a methanolic solution.

In one embodiment, the functional groups are oxygenated functional groups selected from the group comprising C—O species (alcohol, phenol, ether, epoxide), C=O species (aldehyde, ketone, quinone), and O—C=O species (carboxylic acid, ester, anhydride, lactone, pyrone).

It is preferred that the carbon nanotubes are single-walled or multi-walled nanotubes.

In one embodiment approximately 1 per 200 to 1 per 10 carbon atoms of the carbon nanotubes, preferably approximately 1 per 150 to 1 per 20 carbon atoms of the carbon nanotubes, more preferably approximately 1 per 100 carbon atoms of the carbon nanotubes are in an oxidized state.

It is preferred that the monomer molecules are isocyanic acid and/or cyanate ion.

In one embodiment the precursor of the at least one type of monomer molecules is urea and/or its derivatives.

In another embodiment, the precursor of the at least one type of monomer molecules is selected from the group comprising cyanuric acid, cyanuric chloride, isocyanuric acid and trichloroisocyanic acid.

In yet another embodiment, the precursor is a cyanate salt, such as the cyanate salt of an alkali metal or a quaternary ammonium cyanate.

It is preferred that the method according to the present invention comprises the additional step(s):
ba) heating the mixture, or, alternatively,
bb) acidifying the mixture or,
both steps ba) and bb), wherein, preferably the heating and/or acidifying is such, that the precursor of the at least one type of monomer molecules is induced to form said monomer molecules.

Preferably, the at least one type of monomer molecules or the precursor of the at least one type of monomer molecules is provided in a solvent.

In one embodiment the carbon nanotubes are provided in a solvent.

Preferably, the solvent of the monomer or its precursor is the same as the solvent of the carbon nanotubes, or the solvents are different.

In one embodiment, the solvent(s) can be heated to a temperature close to or above the melting point of the monomer or its precursor, without decomposing.

In one embodiment, before, during or after the polymerization reaction, at least one aldehyde is added to the mixture, wherein, preferably, the at least one aldehyde is selected from the group comprising acetaldehyde, benzaldehyde, carboxybenzaldehyde, cinnamaldehyde, chlorobenzaldehyde, ferrocene carboxaldehyde, formaldehyde, furfural, glutaraldehyde, paraformaldehyde, polyhydroxyaldehyde, propionaldehyde, pyridine aldehyde, salicylaldehyde and valeraldehyde.

A polyhydroxyaldehyde is a class of carbohydrate including aldoses. An aldose is a monosaccharide sugar that contains the aldehyde group (—CHO). An aldose can further be classified as aldotriose, aldotetrose, aldopentose, and aldohexose, depending on the number of carbon atoms in the sugar. Examples of these are glyceraldehyde (an aldotriose), erythrose (an aldotetrose), ribose (an aldopentose), and glucose (an aldohexose). Aldopentose and aldohexose compounds exist in aqueous solution in equilibrium with their five or six member ring hemiacetal forms. Certain di-, tri-, and polysaccharides that contain aldose components are also polyhydroxyaldehyde compounds according to the present invention. Examples of disaccharides that are polyhydroxyaldehydes are maltose and lactose.

Preferably the benzaldehyde is substituted with at least one electron-donating group, selected from —NHR, —NRR', —OH, —OR, —$C_6H_5$, —$CH_3$, —$CH_2R$, —$CHR_2$ and $CR_3$, wherein R and R' represent linear or branched $C_1$-$C_{12}$ alkyl groups, $C_3$-$C_8$ cycloalkyl groups, $C_6$-$C_{12}$ aralkyl groups, $C_6$-$C_{12}$ aryl groups, poly(ethylene oxide), poly(propylene oxide), and poly(ethylene oxide)-co-poly(propylene oxide) block co-polymers.

In one embodiment, the at least one electron-donating group on benzaldehyde is in the para-position.

Preferably, the at least one electron-donating group on benzaldehyde is —OH or —OR, wherein R represents a linear or branched $C_1$-$C_{12}$ alkyl group, a $C_3$-$C_8$ cycloalkyl group, a $C_6$-$C_{12}$ aralkyl group, a $C_6$-$C_{12}$ aryl group, poly (ethylene oxide), poly(propylene oxide), or poly(ethylene oxide)-co-poly(propylene oxide)block co-polymer.

More preferably, the at least one aldehyde is selected from the group comprising p-anisaldehyde, 4-propoxybenzaldehyde and 4-(hexyloxy)benzaldehyde.

If the aldehyde is added before and/or during polymerization, in one embodiment of the method according to the present invention, it should have a boiling point greater than approximately 100° C. Paraformaldehyde is a non-volatile polymeric form of formaldehyde that depolymerizes to formaldehyde. Benzaldehyde and glutaraldehyde are common aldehydes with high boiling points (>170° C.).

The criterion for the boiling point of the aldehyde in this particular embodiment, is that the aldehyde can be present during the polymerization long enough to react without evaporating completely.

In one embodiment, after step c), non-reacted monomer and/or precursor is removed from the reaction, wherein, preferably, the removal occurs by a salt precipitation step, and/or by centrifugation or filtration, each of both possibilities optionally followed by washing, and/or the removal further occurring by size separation and/or adsorption, and/or by enzymatic degradation, and/or by selective burning, and/or by plasma treatment, and wherein, even more preferably, the salt precipitation occurs by addition of a salt, preferably a perchlorate salt, in particular sodium perchlorate, the filtration occurs using a membrane filter having a pore size smaller than 1 μm but larger than 0.01 μm, the size separation and/or adsorption occurs by gel-filtration, preferably over a dextran-based material, more preferably Sephadex, and the enzymatic degradation occurs by means of urease. In one embodiment, the precipitation selectively precipitates modified CNTs.

Selective burning is based on the principle that most organics will burn in air under conditions where CNTs are stable. Therefore heating to appropriate temperatures for appropriate times will result in the CNTs remaining while other organics have simply burned away. Reasonable temperature and time ranges are 300° C. to 550° C. and 10 minutes to 24 hours (shorter times when higher temperatures are used).

Similarly plasma treatment can be used for selective removal of organics on CNTs, and the conditions are similar to ones that are used to clean silicon substrates (these will depend on the type of plasma generator): Exemplary conditions are Oxygen plasma treatment at room temperature
Applied radio frequency (RF): 13.56 MHz
RF power: 10-100 W
$O_2$ pressure: 0.1-1 mbar
Time: 10 seconds to 5 minutes In one embodiment, after polymerization an amine-reactive compound, such as carboxylic acid anhydride, is added and reacted with the modified carbon nanotubes.

It is preferred that the modified carbon nanotubes are dissolved in aqueous solution or in alcoholic solution, preferably methanolic solution.

The object of the present invention are also solved by a method of solubilizing carbon nanotubes, comprising the steps:

a) providing, in any order:
  carbon nanotubes, and
  urea;
b) mixing together the nanotubes and the urea;
c) heating the mixture of b).

Preferably, the carbon nanotubes are as defined above.

In one embodiment, the heating is above the melting temperature of urea, wherein, preferably, the heating is in the range of approximately 130° C.-180° C., more preferably approximately 150° C.-170° C., even more preferably approximately 150-160° C., most preferably approximately 150° C.

In one embodiment, the heating is for approximately 1-60 min, preferably approximately 3-20 min, more preferably approximately 5-15 min, most preferably approximately 10 minutes.

In one embodiment, the at least one aldehyde is added to the mixture of b). Preferably it is added to the mixture of b) before or during step c). In one embodiment the at least one aldehyde is added during step c), preferably 1-5 minutes after step c) has been initiated, most preferably 1-3 minutes after step c) has been initiated.

In one embodiment, the at least one aldehyde is added to the mixture of b) during step c), preferably after the urea is completely molten.

In one embodiment, for the purpose of adding the at least one aldehyde during step c), as outlined before, the heating is interrupted when adding the aldehyde, and is thereafter resumed. In one embodiment, wherein for the purpose of adding the at least one aldehyde during step c), the heating is interrupted when adding the aldehyde, and is thereafter resumed, the total duration of heating, as recited above ("the heating is for approximately 1-60 min. preferably approximately 3-20 min, more preferably approximately 5-15 min, most preferably approximately 10 min"), this total duration includes the time of adding the aldehyde.

In another embodiment, the total duration of heating is for approximately 1-60 min, preferably approximately 3-20 min, more preferably approximately 5-15 min, most preferably approximately 10 min, irrespective of any addition of aldehyde.

In one embodiment, the at least one aldehyde is selected from the group comprising acetaldehyde, benzaldehyde, carboxybenzaldehyde, cinnamaldehyde, chlorobenzaldehyde, ferrocene carboxaldehyde, formaldehyde, feral, glutaraldehyde, paraformaldehyde, polyhydroxyaldehyde, propionaldehyde, pyridine aldehyde, salicylaldehyde and valeraldehyde.

A polyhydroxyaldehyde is a class of carbohydrate including aldoses. An aldose is a monosaccharide sugar that contains the aldehyde group (—CHO). An aldose can further be classified as aldotriose, aldotetrose, aldopentose, and aldohexose, depending on the number of carbon atoms in the sugar. Examples of these are glyceraldehyde (an aldotriose), erythrose (an aldotetrose), ribose (an aldopentose), and glucose (an aldohexose). Aldopentose and aldohexose compounds exist in aqueous solution in equilibrium with their five or six member ring hemiacetal forms. Certain di-, tri-, and polysaccharides that contain aldose components are also polyhydroxyaldehyde compounds according to the present invention. Examples of disaccharides that are polyhydroxyaldehydes are maltose and lactose.

Preferably the benzaldehyde is substituted with at least one electron-donating group, selected from —NHR, —NRR', —OH, —OR, —$C_6H_5$, —$CH_3$, —$CH_2R$, —$CHR_2$ and $CR_3$, wherein R and R' represent linear or branched $C_1$-$C_{12}$ alkyl groups, $C_3$-$C_8$ cycloalkyl groups, $C_6$-$C_{12}$ aralkyl groups, $C_6$-$C_{12}$ aryl groups, poly(ethylene oxide), poly(propylene oxide), and poly(ethylene oxide)-co-poly(propylene oxide) block co-polymers.

In one embodiment, the at least one electron-donating group on benzaldehyde is in the para-position.

Preferably, the at least one electron-donating group on benzaldehyde is —OH or —OR, wherein R represents a linear or branched $C_1$-$C_{12}$ alkyl group, a $C_3$-$C_8$ cycloalkyl group, a $C_6$-$C_{12}$ aralkyl group, a $C_6$-$C_{12}$ aryl group, poly(ethylene oxide), poly(propylene oxide), or poly(ethylene oxide)-co-poly(propylene oxide)block co-polymer.

More preferably, the at least one aldehyde is selected from the group comprising p-anisaldehyde, 4-propoxybenzaldehyde and 4-(hexyloxy)benzaldehyde.

In one embodiment, the product of step c) is dissolved in aqueous solution or alcoholic, preferably methanolic, solution or a mixture of an aqueous and an alcoholic solution and subjected to a salt precipitation step, and/or centrifugation or filtration, each of both possibilities optionally followed by washing, and/or subjected to size-separation and/or adsorption, and/or enzymatic degradation, and/or selective burning, and/or plasma treatment.

In one embodiment, the salt precipitation occurs by addition of a salt, preferably a perchlorate salt, in particular sodium perchlorate, the filtration occurs using a membrane filter having a pore size smaller than 1 μm but larger than 0.01 μm, the size separation and/or adsorption occurs by gelfiltration, preferably over a dextran-based material, more preferably, Sephadex, and the enzymatic degradation occurs by means of urease. In one embodiment, the precipitation selectively precipitates modified CNTs.

Preferably the product of step c) is dissolved in an aqueous solution or alcoholic, preferably methanolic solution or a mixture of an aqueous and an alcoholic solution and is subjected to an evaporation step.

The objects of the present invention are also solved by a carbon nanotube, produced by the method according to the present invention.

Preferably the nanotube is non-bundled.

In one embodiment, the carbon nanotube is decorated in a pearl chain-like manner with discrete bodies, when viewed by AFM.

In one embodiment these discrete bodies are polymeric, "polymeric", in this context meaning "comprising polymers".

Preferably, the carbon nanotube has one or more physical characteristics selected from the group comprising:
 a solubility in water or aqueous solution of up to approximately 10 g/l and/or solubility in methanol or methanolic solution of up to approximately 1 g/l.
 an absorption maximum between 210 nm and 250 nm,
 an emission maximum between 500 nm and 550 nm, when excited with UV or blue light (330 nm-430 nm), and
 one or several or all of the following absorption maxima in the infrared in the following wavenumber regions: 3470-3490 $cm^{-1}$, 3420-3440 $cm^{-1}$, 3365-3385 $cm^{-1}$, 3330-3350 $cm^{-1}$, 3245-3265 $cm^{-1}$, 3210-3230 $cm^{-1}$, 1660-1680 $cm^{-1}$, 1610-1630 $cm^{-1}$, 1450-1470 $cm^{-1}$, 1330-1350 $cm^{-1}$ and 1095-1115 $cm^{-1}$.

It has to be said, though, that the inventors do not wish to be limited to the notion that these physical properties are intrinsic to the nanotubes themselves. These characteristics may also be due to the discrete bodies attached to the nanotubes or due to the preparation of the nanotubes. This may apply, in particular, to the emission maximum mentioned above.

The objects of the present invention are also solved by an association of carbon nanotubes according to the present invention, wherein the carbon nanotubes are non-bundled, but interconnected at their ends through said discrete bodies into branched structures, when viewed under AFM.

The objects of the present invention are also solved by a carbon nanotube or an association of carbon nanotubes, which has been produced by the method, in which method the product of step c) is dissolved in aqueous solution or alcoholic, preferably methanolic, solution or a mixture of an aqueous and an alcoholic solution, and is subjected to an evaporation step.

Preferably, such a carbon nanotube or association of carbon nanotubes is preferably at least partially crystalline.

In one embodiment such a carbon nanotube or association of carbon nanotube has one or more physical characteristics, selected from the group comprising:
 one or several or all of the following absorption maxima in the infrared in the following wavenumber regions: 3370-3390 $cm^{-1}$, 3205-3225 $cm^{-1}$, 3060-3080 $cm^{-1}$, 1700-1720 $cm^{-1}$, 1680-1700 $cm^{-1}$, 1655-1675 $cm^{-1}$, 1580-1600 $cm^{-1}$, 1500-1520 $cm^{-1}$, 1440-1460 $cm^{-1}$, 1395-1415 $cm^{-1}$, 1245-1265 $cm^{-1}$, 1155-1175 $cm^{-1}$, 1020-1040 $cm^{-1}$, 845-865 $cm^{-1}$, 795-815 $cm^{-1}$,
 having both crystalline and amorphous parts when viewed under AFM, TEM and/or SEM,
 a solubility in water or aqueous solution of up to approximately 10 g/l and/or a solubility in methanol or methanolic solution of up to approximately 1 g/l.

The objects of the present invention are also solved by the use of a carbon nanotube or of an association of carbon nanotubes according to the present invention as outlined above in an electronic device, a nanoelectronic device, a memory element, a field emission device, a sensor, an actuator, an electromechanical device, a composite material, a coating/paint/paste, a hydrogen storage device, a battery or fuel cell, a supercapacitor, a photoelectrochemical device, a photovoltaic device, an energy conversion device, a light emitting diode, a liquid crystal display, a probe scanning probe microscopy, a non-linear optical device or antenna, or a catalyst.

The objects of the present invention are also solved by the use of the method according to the present invention for orienting and/or purifying carbon nanotubes, in particular single walled carbon nanotubes (SWNTs).

For purposes of orienting the carbon nanotubes, the method according to the present invention is preferably performed on a surface, more preferably on a polymer or silicon-based surface.

It should be understood that the mixing of the carbon nanotubes and the at least one type of monomer (or the precursor thereof, or urea etc.) can be achieved by various means, such as are well known to someone skilled in the art. These include, but are not limited to grinding, milling, in particular ball-milling, sand-milling etc. Furthermore it is clear that the carbon nanotubes provided can be treated with other methods that are commonly known to someone skilled in the art. For example they may, before or after the reaction of the present invention, be ultra-sonicated, they may be heated in a vacuum or under inert atmosphere or they may be further functionalized. If they are thermally annealed (heated) and this takes place after the reaction of the invention, this may remove the functionalization achieved by the reaction of the invention and even reverse the effects of a previous oxidative treatment. Such a subsequent thermal annealing treatment may be necessary to restore the electronic properties of pristine carbon nanotubes. Temperatures in the range of approximately 200-1200° C. are effective for this purposes. It is also clear that various means of size separation can be used, so as to separate unreacted small molecule parts from the reacted portions. For example appropriate gel-filtration material, chosen by the experimenter depending on the desired size exclusion, can be used. Various grades of Sephadex gel-filtration material seem to be appropriate in a preferred embodiment, for example Sephadex G-100 or G-10. However other types of Sephadex and dextran-based materials can be used instead, the only criterion being that an effective separation of small molecules from portions/compounds having undergone the reaction(s) of the present invention takes place. Furthermore, small molecules and non CNT-particles and/or non-modified CNTs may be removed by adsorption to a gel-filtration material, which material may be the same as defined above for the size-exclusion step. Furthermore, small molecules can also be removed by the use of appropriate degradation enzymes, e.g. urease in the case of urea. Another way of separation is selective precipitation of (modified) CNTs, e. g. by means of a salt, preferably a perchlorate, in particular sodium perchlorate. Furthermore filtration may be used as a method of collecting and washing carbon nanotubes, following wet chemical treatments, as has already been outlined above.

As used herein, the term "precursor" is meant to encompass any chemical entity that is capable of providing monomers for a subsequent polymerization reaction. The term "monomer", as used herein, is meant to encompass any chemical entity that is capable of reacting with like molecules and thereby form a larger entity comprising more than one of the original monomers. It is clear that the term "monomer" also encompasses "oligomers" which are still capable of undergoing a polymerization reaction.

A reaction or polymerization is said to occur "at the functional groups" in the sense that the growing polymer chain or reaction product, at one of its ends, is either covalently bonded to a functional group/functional groups or non-covalently adsorbed thereto, or both, in the sense that within one experimental set-up some growing polymer chains or reaction products are covalently bonded to functional group and other polymer chains or reaction products are non-covalently adsorbed thereto. The term "occurs at the functional groups", as, used herein, is used interchangeably with "is initiated by the functional groups". It can also mean that the functional groups serve as initiation sites for polymerization. In doing so, the functional groups may either serve directly as a site where polymerization occurs or they may first be converted to a functional group at which then the polymerization occurs. Preferably this conversion is due to the monomer molecules and/or their precursor and/or a decomposition product of the monomer or its precursor. An example for the latter reaction can be seen from FIG. 3 in "Reactions involving epoxide groups", where ammonia, a decomposition product of urea, converts an epoxide to an amine and an OH-group where then polymerization takes place.

It should also be understood that the heating step according to the present invention can be performed by any conventional heating means, e. g. an oven, hot plate, oil bath or heat gun. In one embodiment it is performed using a heat gun.

"Derivatives of urea" are e. g. nitrourea, urea hydrochloride, urea hydrogen peroxide, urea nitrate, and ammonium carbamate, all of which can act as sources of ultimately isocyanic acid.

It has surprisingly been found that performing a polymerization reaction on the carbon nanotubes, in effect, exfoliates the tubes and solubilizes them such that afterwards they are present as single, non-bundled entities. The method according to the present invention, as opposed to prior-art-methods, yields non-bundled carbon nanotubes, i. e. tubes which are not in an association of essentially parallel CNTs that are in contact with each other. A preferred polymerization reaction that is taking place on the carbon nanotubes is the polymerization of isocyanic acid/cyanate as a decomposition product of urea, to polyisocyanate appendages. Urea has often been used as a source of isocyanic acid. For such purposes, urea can either be used neat in the molten state (mp 133° C.), or dissolved in water or an organic solvent. Alternative exemplary sources of isocyanic acid include a) thermal depolymerization of cyanuric acid or isocyanuric acid, b) hydrolysis of cyanuric chloride and subsequent depolymerization of the resultant cyanuric acid, c) acidification of cyanate salts, d) hydrolysis of trichloroisocyanic acid and subsequent depolymerization of the resultant isocyanuric acid, and e) thermal decomposition of nitrourea (Davis et al. (1929) J. Am. Chem. Soc. 51, 1790). All these sources of isocyanic acid are to, be understood as "precursors of the at least one type of monomer" where isocyanic acid or cyanate ion is the monomer in the present invention.

It has also surprisingly been found that a solubilization of nanotubes can be achieved by letting a urea melt react with the nanotubes, preferably prepurified ones. The yield of soluble nanotubes can be even further improved by adding an aldehyde to the melt. The nanotubes thus produced can form crystal-like structures when they have become dissolved and the solvent becomes evaporated. In that case, crystal-like, birefringent structures are formed, presumably containing aligned nanotubes, which further assemble into more complex forms having dimensions of up to ca. 100 μm.

In the following, the chemistry of urea and isocyanic acid/cyanate is further explained.

Despite its simple structure, the chemistry of urea ($NH_2CONH_2$) can be quite complex, mainly because of the extremely reactive nature of one of its decomposition products, isocyanic add (HNCO). It is often assumed that an equilibrium exists between urea and ammonium cyanate ($NH_4CNO$):

$$NH_2CONH_2 \Leftrightarrow NH_4CNO, \quad (1)$$

The synthesis of urea from ammonium cyanate by Wöhler was the first example of an "organic" compound being synthesized in the laboratory from purely "inorganic" ones. Much of the current interest in the chemistry of urea stems from its possible role in pre-biotic evolution, as well as its importance as a fertilizer.

Since ammonium ion ($NH_4^+$) is weakly acidic and cyanate ion ($CNO^-$) is weakly basic, the equilibrium in equation (1) can be extended to include ammonia ($NH_3$) and cyanic acid (CNOH):

$$NH_4CNO \Leftrightarrow NH_3 + CNOH \quad (2).$$

While cyanic acid is stable enough to be isolated, isocyanic add is the thermodynamically favored isomer under normal conditions.

$$CNOH \Leftrightarrow HNCO \quad (3)$$

Both isomers are very chemically reactive.

Isocyanic acid, like its organic isocyanate R—N=C=O) derivatives, can react with compounds containing active hydrogen atoms, including carboxylic acids and phenols. Standard methods for purifying SWNTs involve oxidizing conditions that generate such oxygenated functional groups at their ends and at defect sites along their sidewalls. Based on these considerations, the present inventors anticipated that molten urea could react with acid-purified SWNTs, resulting in covalent attachment of highly polar substituents derived from urea. For example, SWNT-COOH could react with HNCO to form $CO_2$ plus the amide (SWNT-$CONH_2$). The latter could further react with HNCO to form the acylurea (SWNT-$CONHCONH_2$). Likewise, SWNT-OH could react with HNCO to form the urethane (SWNT-$OCONH_2$), which could further react to form the allophanate (SWNT-OCON-$HCONH_2$). Oxygenated functional groups not containing active hydrogen atoms that may be present on purified SWNTs (e.g., anhydride, lactone, ketone, epoxide) could participate by reacting first with $NH_3$, which is also present in molten urea, and subsequently with HNCO. These various addition reactions of HNCO may be reversible. The present inventors further investigated the possibility of tuning the solubility of SWNTs modified by molten urea by incorporating para-substituted alkoxy benzaldehyde derivatives, in particular p-anisaldehyde, 4-propoxybenzaldehyde, or 4-(hexyloxy)benzaldehyde into the process.

In summary, isocyanates (RNCO), which are organic derivatives of isocyanic acid, are very reactive and undergo a great many reactions, especially addition reactions with compounds containing active hydrogen and polymerization (self-addition). Several of these reactions are listed below and are representative of the reactions of isocyanic acid (where R=H) as well.

1. Reaction with alcohols and phenols to form urethanes:

$$RNCO + HOR' \rightarrow RNH-CO-OR' \quad (4)$$

2. Reaction with amines to form ureas:

$$RNCO + H_2NR' \rightarrow RNH-CO-NHR' \quad (5)$$

3. Reaction with carboxylic acids to form amides:

$$RNCO + HOOCR' \rightarrow RNH-COR' + CO_2 \quad (6)$$

4. Reaction with urethanes to form allophanates:

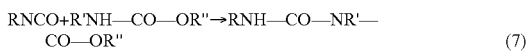
$$\text{RNCO} + \text{R'NH—CO—OR"} \rightarrow \text{RNH—CO—NR'—CO—OR"} \quad (7)$$

5. Reaction with ureas to form biurets:

$$\text{RNCO} + \text{R'NH—CO—NHR"} \rightarrow \text{RNH—CO—NR'—CO—NHR"} \quad (8)$$

6. Reaction with amides to form acylureas:

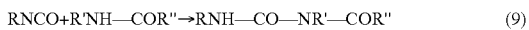
$$\text{RNCO} + \text{R'NH—COR"} \rightarrow \text{RNH—CO—NR'—COR"} \quad (9)$$

7. Dimerization to form uretidiones:

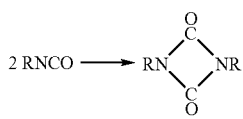
(10)

8. Trimerization to form isocyanurates:

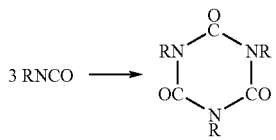
(11)

9. Hydrolysis to form amines:

$$\text{RNCO} + \text{H}_2\text{O} \rightarrow \text{RNH}_2 + \text{CO}_2 \quad (12)$$

Urea has often been used as a source of isocyanic acid for the above reactions. For such purposes, urea can either be used neat in the molten state (mp 133° C.), or dissolved in water or an organic solvent. Alternative sources of isocyanic acid include thermal depolymerization of cyanuric acid, isocyanuric acid, hydrolysis of cyanuric chloride and subsequent depolymerization of the resultant cyanuric acid acidification of cyanate salts, hydrolysis of trichloroisocyanic acid and subsequent depolymerization of the resultant isocyanuric acid, and thermal decomposition of nitrourea (Davis et al. 1929 J. Am. Chem. Soc. 51, 1790). All these sources of isocyanic acid are to be understood as "precursors of the at least one type of monomer" where isocyanic acid or cyanate ion is the monomer in the present invention.

Formaldehyde (or paraformaldehyde) reacts with urea to form addition products with hydroxymethyl end groups or methylene bridges between urea units:

$$\text{H}_2\text{NCONH}_2 + \text{CH}_2\text{O} \rightarrow \text{H}_2\text{NCONHCH}_2\text{OH} \quad (13)$$

$$\text{H}_2\text{NCONHCH}_2\text{OH} + \text{H}_2\text{NCONH}_2 \rightarrow \text{H}_2\text{NCONHCH}_2\text{NHCONH}_2 + \text{H}_2\text{O} \quad (14)$$

Such urea-formaldehyde condensation products are industrially important in materials ranging from plastics and adhesives to fertilizers.

Furthermore, urea is able to form solid-state inclusion compounds (or "clathrates") with long-chained hydrocarbons such as n-alkanes. The host structure consists of continuous one-dimensional channels (ca 0.6 nm diameter) constructed from an essentially infinite three-dimensional hydrogen-bonded network of urea molecules. (Steed, J. W.; Atwood, J. L (2000) Supramolecular Chemistry; John Wiley & Sons, Ltd, Chichester, pp. 272-277) The urea channel structure is only stable when occupied. Urea inclusion compounds based on a layered structure (Lee et al. (2001) J. Am. Chem. Soc. 123, 12684) as well as inclusion compounds involving both urea and one of its decomposition products (Mak et al. (1995) J. Am Chem. Soc. 117, 11995) are also known.

The process that the present inventors developed involves intimate mixing e.g. grinding pre-purified SWNTs with urea before heating. The pre-purified SWNTs used in the experiments are RFP-SWNT from Carbon Solutions, Inc. (Riverside, Calif.). RFP-SWNT consists of nanotubes prepared by the electric arc method that are acid-purified and subsequently processed to reduce functionality. According to the supplier, the RFP-SWNT used in the experiments performed in this invention have a relative purity of 40%, as evaluated according to M. E. Itkis et al., Nano Lett. 3, 309 (2003). The mixing process may facilitate penetration of urea into the nanotube bundles as well as to increase the density of functional groups on the nanotubes by breaking them mechanically. AFM images of the starting RFP-SWNT and UA-SWNTs show mostly bundled nanotubes in both cases. In general, the bundles in RFP-SWNT samples are longer (0.5-10 µm) than those in UA-SWNT samples (0.5-1.5 µm). However, this comparison is purely qualitative, since it is usually not possible to observe both ends of individual nanotubes within the bundles. Individual UA-SWNTs have a height of 1.45 (±0.10) nm (FIG. 13). Temperature and duration of the heat treatment has a pronounced effect on the chemical processes that occur in molten urea, and the present inventors have found that these factors also affect the yield of soluble SWNTs. The best results are achieved by heating the mixture of pre-purified SWNTs and urea for 5-10 minutes at 150-160° C. When the reaction includes an aldehyde, e.g. p-anisaldehyde, the urea melt process is interrupted after 1-5, preferably 1-2 minutes for addition of the aldehyde before heating is continued. SWNTs modified by molten urea alone (hereafter referred to as U-SWNTs) are highly soluble in water (up to 10 g $L^{-1}$), but they are insoluble in common organic solvents. Adding an aldehyde, in particular p-anisaldehyde to the melt yields SWNTs (nanotubes undergoing this treatment are hereafter referred to as UA-SWNTs) that are appreciably soluble in both water and methanol (up to 1 g $L^{-1}$) and also results in approximately a ten-fold increase in the yield of soluble nanotubes. The concentration (mg $L^{-1}$) of SWNTs in extracts of the product is estimated by dividing the absorbance (per cm path length) at 500 nm by the factor 0.0286. J. L. Bahr, E. T. Mickelson, M. J. Bronikowski, R. E. Smalley, J. M. Tour, Chem. Commun. 2001, 193 (2001). Comparing the sum of SWNT mass in each extract (water or methanol) to the mass of RFP-SWNT used in the reaction provides an estimate of the yield of soluble SWNTs. Examples are provided further below. In the U-SWNT preparation given in Example 9, the ratio of the mass of U-SWNT to the mass of RFP-SWNT (12.6 mg) is 0.034. In the two UA-SWNT preparations also given in Example 9, the ratios are 0.36 (2.7 mg RFP-SWNT) and 0.31 (34 mg RFP-SWNT). Without wishing to be bound by any theory, the 10-fold enhancement in yield when p-anisaldehyde is added may be due to a "capping" effect, preventing the addition reactions of HNCO from reversing. In either case, the soluble SWNTs are isolated from excess urea and p-anisaldehyde by extraction, precipitation with sodium perchlorate, gel filtration, or a combination of these methods before analysis.

Besides good solubility in water and methanol, a remarkable feature of the SWTNs prepared according to the present invention, in particular UA-SWNTs is their tendency to self-organize into crystal-like structures upon evaporation from alcoholic solutions, e.g. methanol solutions.

In the following reference is made to the figures, wherein

FIG. 1: shows UV-visible absorption spectra of RFP-SWNTs treated with molten urea and then dissolved in water, before (dashed curve) and after (continous curve) removal of components with high affinity for cross-linked dextran (Sephadex® G-100).

Figure 2:
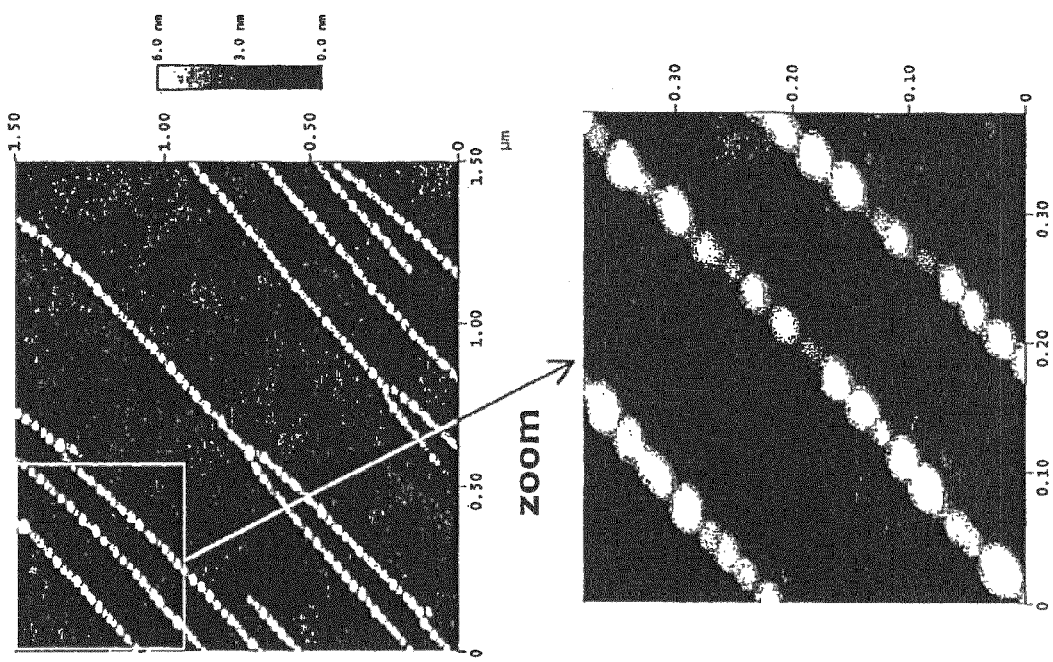

FIG. 2: shows a tapping mode AFM image from a solution of urea-treated RFP-SWNTs applied to a film of polystyrene on mica. The solution used was the one whose UV-visible spectrum is shown in FIG. 1 (continuous curve) and was applied to the film by a spin-coating process.

FIG. 3: shows the postulated chemical reactions involved in the modification of CNTs by treatment with molten urea. The CNTs were previously treated to generate oxidized carbon groups, mainly at nanotube ends and sidewall defects. The three oxidized carbon groups implicated are carboxylic acid, phenol, and epoxide, but other groups could also be involved.

Figure 4:
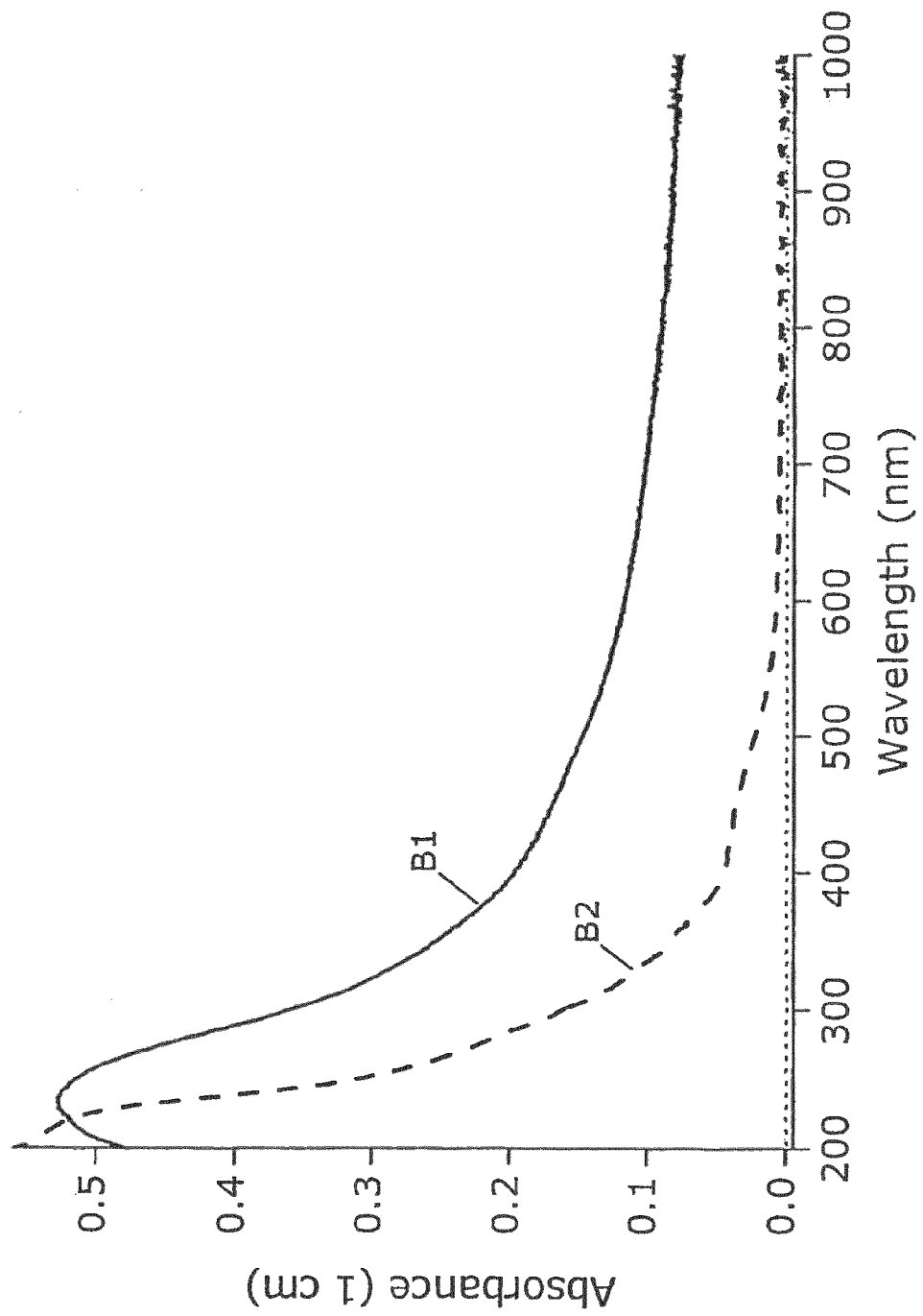

FIG. 4: shows UV-visible absorption spectra of RFP-SWNTs treated with molten urea and then dissolved in water according to Example 1 (see below), after fractionation by column chromatography over Sephadex® G-100 into Solution BI and Solution B2 according to Example 4. Solution B1 was diluted by a factor of 2.5 to obtain the spectrum shown.

Figure 5:
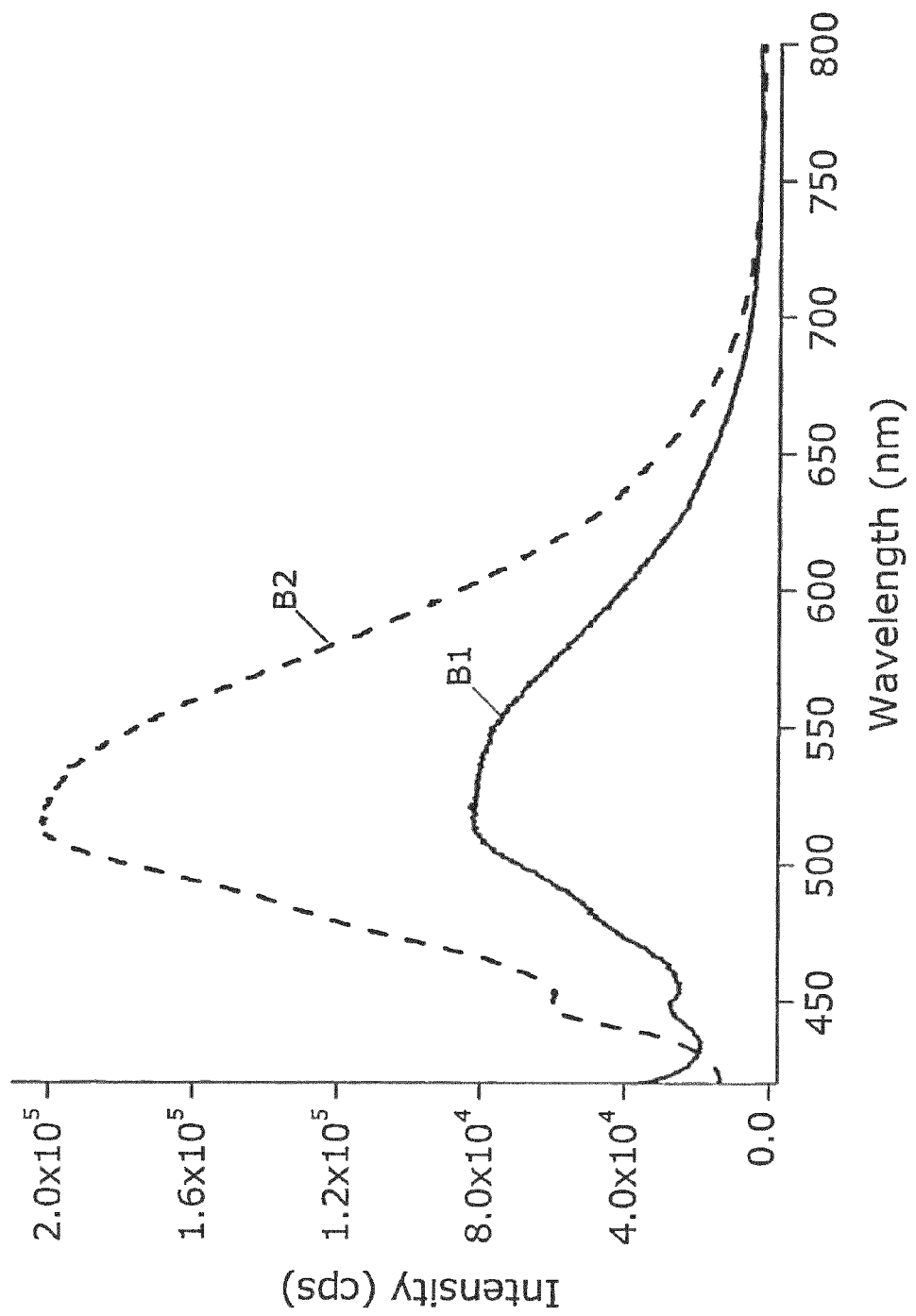

FIG. 5: shows emission spectra of Solution B1 (diluted by a factor of 2.5) and Solution B2 from Example 4 (see below) when excited with 410-nm light. The absorption spectra of these samples are shown in FIG. 4.

Figure 6:
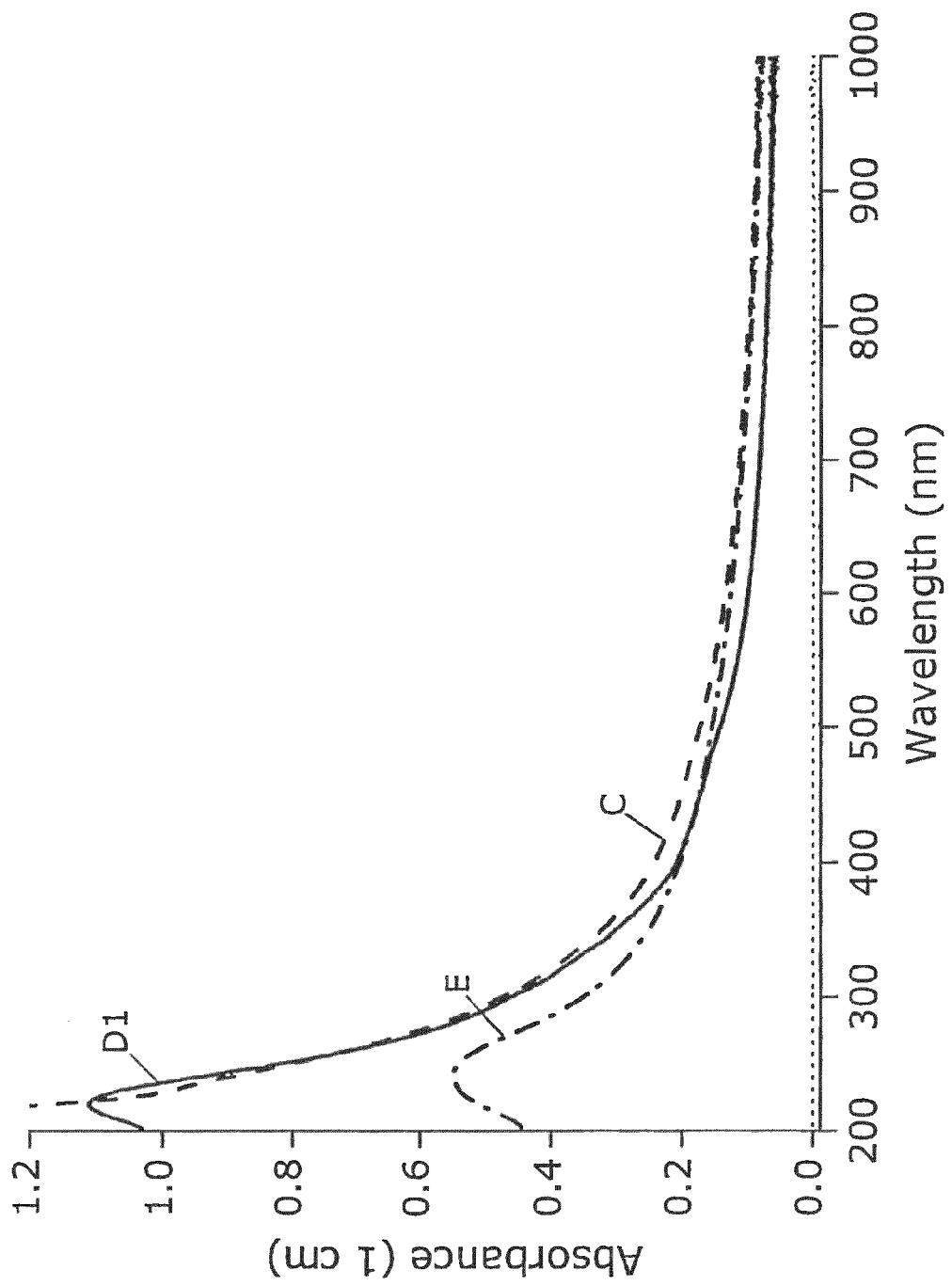

FIG. 6: shows UV-visible absorption spectra of RFP-SWNTs treated with molten urea and then dissolved in water according to Example 5 (see below), before and after fractionation by column chromatography over Sephadex® G-10 according to Example 6 (see below). Solution C (before fractionation) was diluted by a factor of 100 to obtain the spectrum shown (dashed curve). Solution D1 (first fraction) was diluted by a factor of 25 to obtain the spectrum shown (continuous curve). Solution E was obtained from the second fraction by precipitation with sodium perchlorate and re-dissolution in water (dash-dotted curve).

Figure 7:
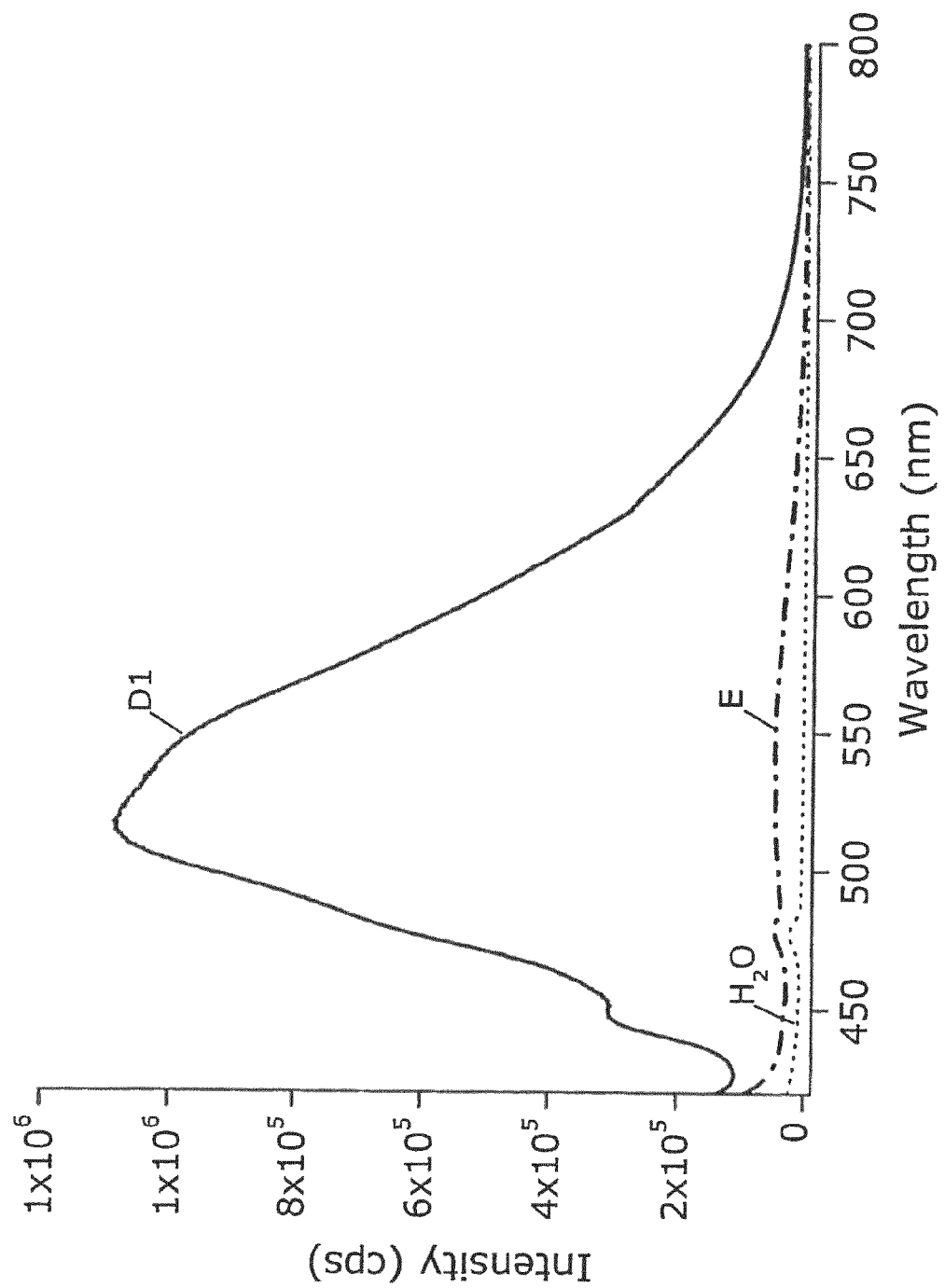

FIG. 7: shows emission spectra of Solution D1 (diluted by a factor of 25) and Solution E from Example 6 and Example 7 (see below), respectively, when excited with 410-nm light. The absorption spectra of these samples are shown in FIG. 6. The signal from a solution of water alone is also shown (dotted curve).

Figure 8:
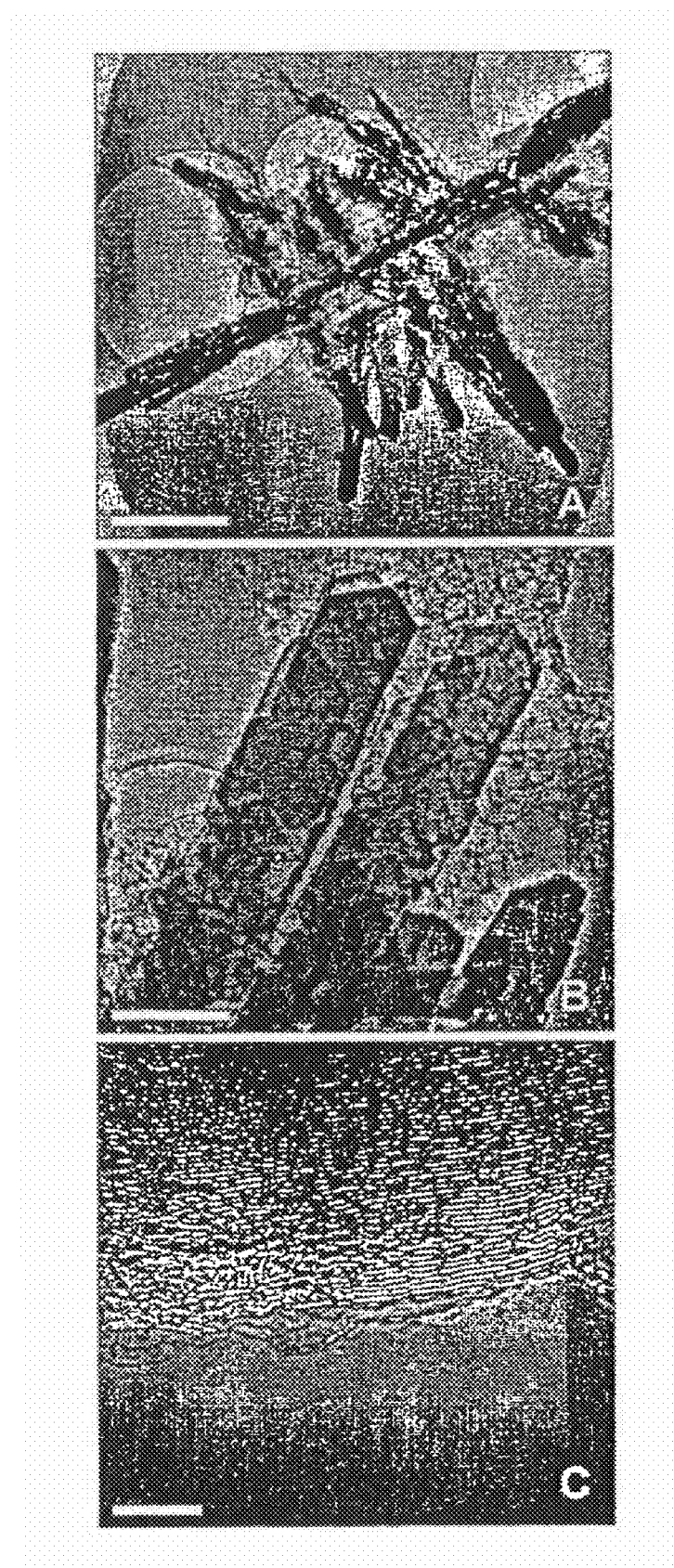

FIG. 8: shows TEM images of UA-SWNT crystalline structures that form when solutions of UA-SWNTs in methanol (ca 800 mg L$^{-1}$) are allowed to evaporate on holey carbon films. Scale bars: A, 1 µm; B, 1 µm; C, 5 nm.

Figure 9:
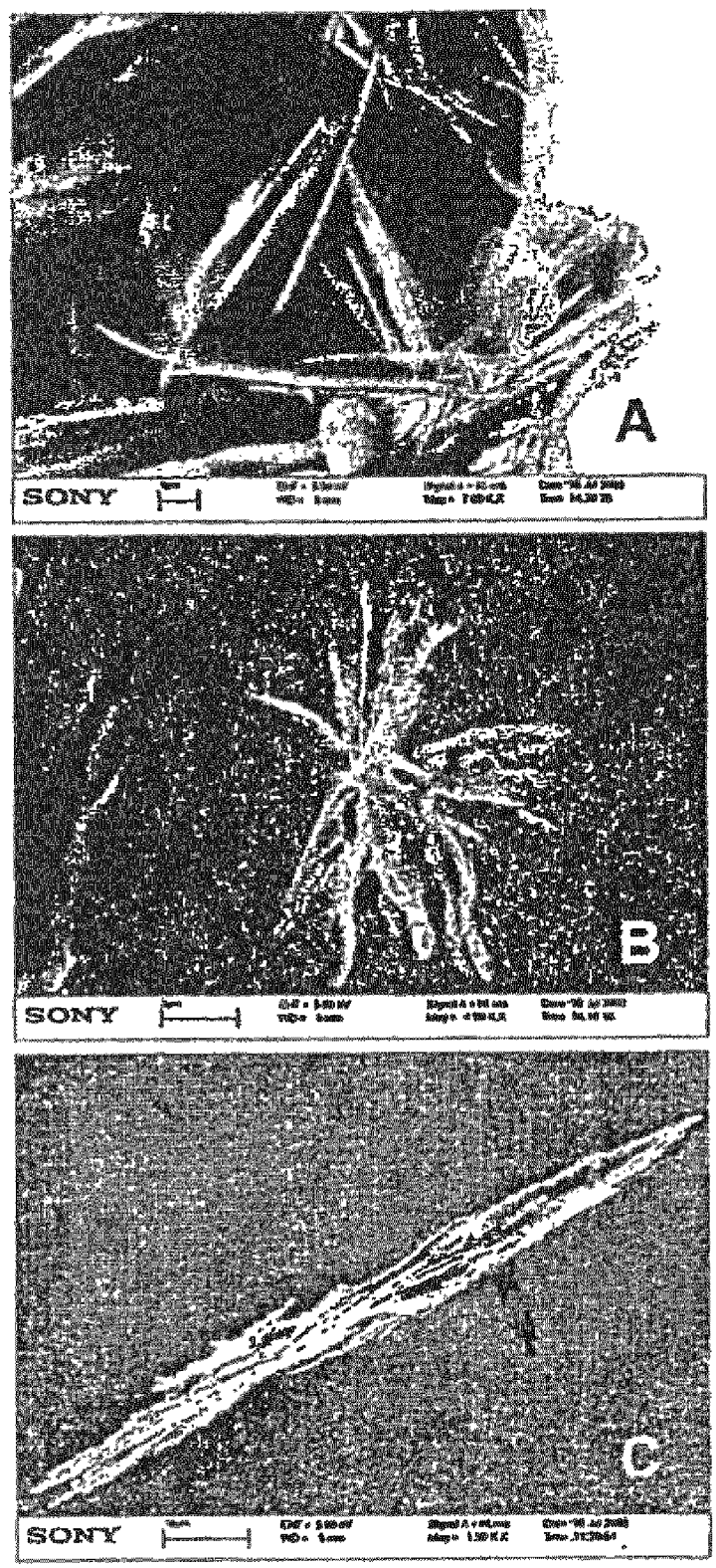

FIG. 9: shows SEM images of UA-SWNT crystalline structures that form when solutions of UA-SWNTs in methanol (ca 800 mg L$^{-1}$) are allowed to evaporate on silicon substrates (A and B, 400-nm oxide; C, native oxide). In A, some of the plate-like objects extend over the edge of the substrate (on right). In B, the light-colored structure containing nanotubes is partially submerged in a grainy material that probably contains metal catalyst nanoparticles. Scale bars: A, 1 µm; B, 3 µm; C, 10 µm.

Figure 10:
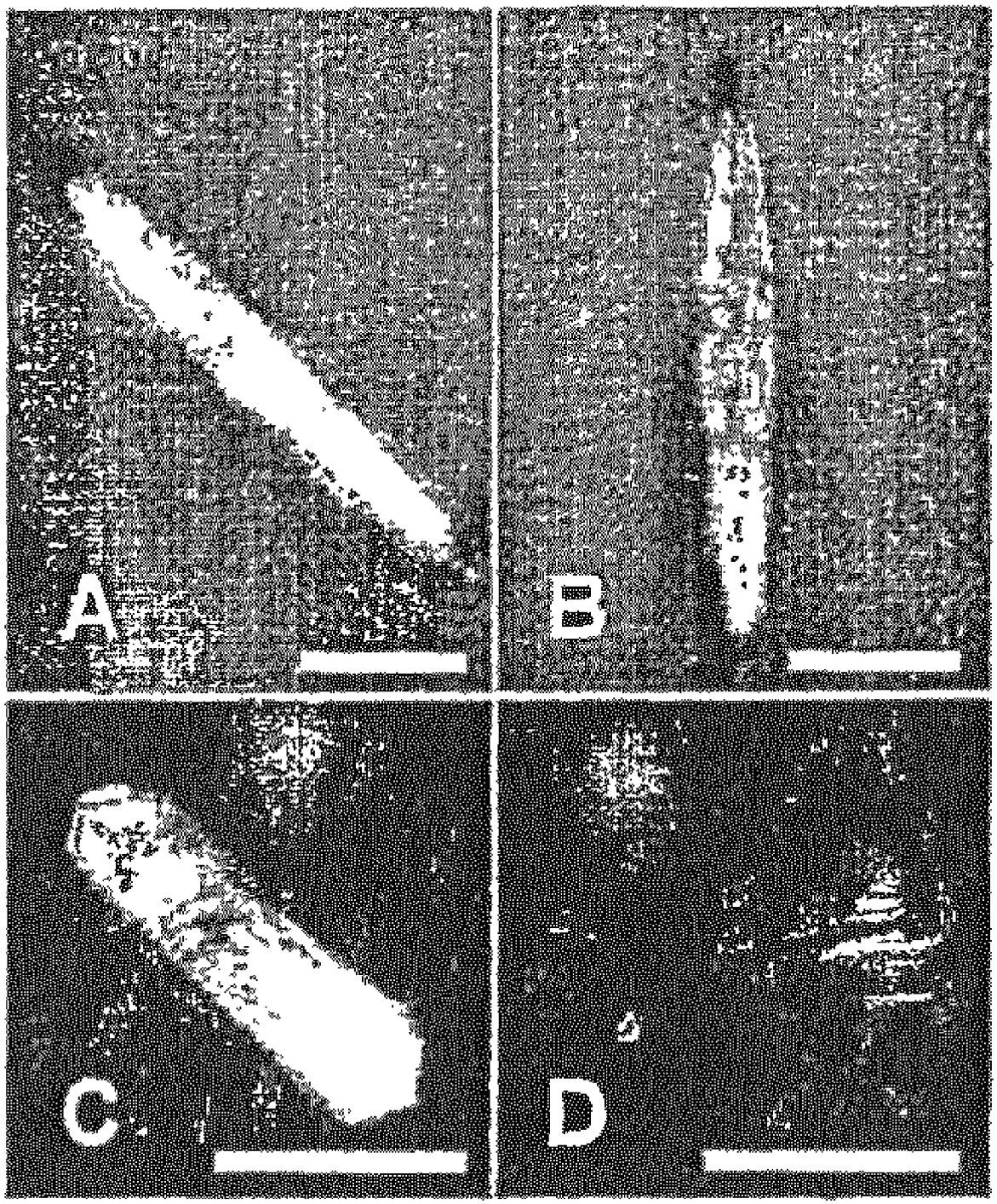

FIG. 10: shows polarized optical microscope images of UA-SWNT crystalline structures taken in reflection mode using white incident light and a pair of crossed polarizer (0°) and analyzer (90°), with the crystal orientation of 0° or 45°. The crystalline structures do not noticeably polarise unpolarised light. Scale bars: 20 µm.

Figure 11:
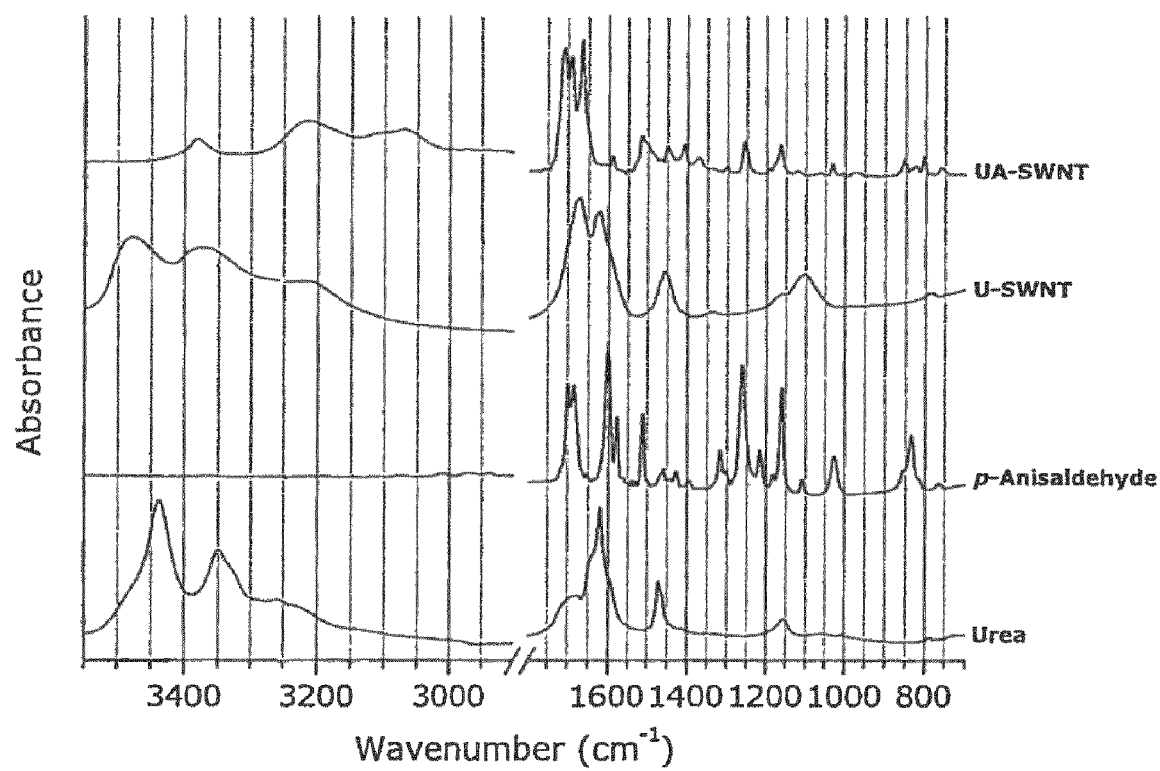

FIG. 11: shows IR absorption spectra of U-SWNTs and UA-SWNTs on silicon substrates, obtained with an IR microscope in transmission mode. For comparison, the spectra of urea and p-anisaldehyde are also shown The samples are prepared by allowing solutions in methanol to evaporate on native oxide silicon or by applying neat p-anisaldehyde to hydrogen-terminated silicon.

The invention will now be further described and better understood by the following examples which are presented for illustrative, non-limiting purposes.

EXAMPLE 1

Characterization

In all examples that follow, one or several of the following characterization steps were performed: UV-visible absorption spectra were measured with a Varian Cary 50 spectrophotometer, using 1 cm path-length quartz cuvettes. Tapping mode AFM measurements were made in air using a Digital Instruments Dimension 3100 scanning probe microscope with a NanoScope IV Controller and tetrahedral tip silicon cantilevers (Olympus Optical OMCL-AC160TS). The TEM measurements were performed using a TECNAI G2 F20 instrument operated at 200 kV. The samples for the TEM experiments were prepared using holey carbon films on 300-mesh copper grids (Plano S147-3). For SEM imaging, a Leo Gemini 1530 Field Emission Scanning Electron Microscope was used with beam voltage of 5 kV. For optical microscopy, we used a Leica DMRX polarizing microscope, in reflectance mode. The illumination source was a 12V, 100 W halogen bulb. The images were captured using a Hamamatsu C4742 camera coupled with a Micro-Color RGB-MS-C color filter. IR absorption spectra were obtained with a Bruker ISF 66 FT-IR spectrometer with an IRscope II attachment. The spectra were recorded in transmission mode with a resolution of 10 cm$^{-1}$.

Modification of CNTs Using Urea Melt

The CNTs used for these experiments were purchased from Carbon Solutions, Inc. (5094 Victoria Hill Drive, Riverside, Calif. 92506). The product name is RFP-SWNT. According to information provided by the supplier, RFP-SWNT is prepared from their product named AP-SWNT by acid purification with subsequent processing to reduce functionality. The AP-SWNT product consists of single-walled CNTs prepared by the electric arc method. Hu et al. (2001)[47] determined the mole percentage of acid sites (including carboxylic acids, lactones, and phenols) relative to the total amount of carbon in RFP-SWNTs by acid-base titration and found 1%, of which 0.7-0.8% could be attributed to carboxylic acid groups. The percentages found for the CNTs without the processing step to reduce functionality were 2.7% (total acid sites) and 2.1-2.2% (carboxylic acid groups). Thus it can be concluded that the process used to reduce the functionality of acid purified AP-SWNT CNTs reduces it by approximately two-thirds. The degree of functionality on RFP-SWNT is still appreciable, however, approximately one carbon per 100 being bonded to at least one oxygen atom to produce an acidic site, approximately three-quarters of which are —COOH groups. These groups are expected to be located predominantly at nanotube ends and sidewall defect sites.

RFP-SWNT (2.46 mg) was placed in a glass test tube (Schott Duran®, 12×100 mm) and pulverized with a glass stirring-rod (5 mm diameter). Urea (98.5 mg) was added and thoroughly pulverized with the RFP-SWNT to yield a gray powder. The powder was heated by placing the bottom of the test tube at the exit port of a heat gun (Steinel Typ 3449, 2000 W) set to have a maximum temperature at the exit of 160° C. The powder melted to give a black liquid, which was kept agitated by rotating and shaking the tube manually. After 10 minutes, the mixture was allowed to cool to room temperature, yielding a black solid. Water (0.50 ml) was added to the solid, which appeared to dissolve completely within a few seconds by simple mixing, giving a dark black solution. A small volume (10 µl) of the solution was diluted with water (1000 µl) in a quartz cuvette and the UV-visible absorption spectrum was recorded. The spectrum is shown in FIG. 1 (dashed curve). The solution in the test tube was transferred to a small polypropylene centrifuge tube together with the solution in the cuvette. It was centrifuged at 5000 rpm for 10 minutes two times. The pH of the solution was 8.15.

EXAMPLE 2

Chromatography Over Sephadex G-100

Two drops (approximately 50 µl) of the centrifuged solution from Example 1 were applied to a small column (7×45 mm) of Sephadex® G-100 swollen in water. After entering the column bed, the solution was eluted with water. A gray band moved through the column and was collected. Another gray band remained at the top (1-2 mm) of the column bed and could not be washed out. The solution that was collected was transferred to a quartz cuvette, diluted with water (total volume approximately 0.7 ml), and the UV-visible absorption spectrum was recorded. The spectrum is shown in FIG. 1 (continuous curve). It shows a nearly featureless rise in absorption from 1000 nm to 300 nm and a maximum at 242 nm. This solution is referred to below as Solution A.

EXAMPLE 3

AFM Measurements

A substrate for AFM measurements was prepared by applying a drop of a 2.5 wt-% solution of polystyrene (Aldrich #44.114-7. average $M_w$ ca. 350.000) in toluene to a mica substrate. The substrate was rotated at 600 rpm while a drop (20 µl) of Solution A (undiluted) was applied to the center. The rotation rate was increased to 700 rpm, causing most of the solution to be ejected from the substrate. Afterwards, spinning it at 4000 rpm for 90 s dried the substrate.

An AFM image obtained by scanning at a location near the center of the substrate is shown in FIG. 2, together with a zoomed-in section of the image.

The fact that the RFP-SWNT material becomes water-soluble after melting its powdered mixture with urea is most likely due to covalent modification of the CNTs or non-covalent adsorption of water-soluble polymer products. While not intending to be limited to any particular theory, the present inventors favor the covalent modification possibility due to the fact that the same process fails to render as-prepared single-walled CNTs water-soluble. As noted above, roughly one carbon atom per 100 of the CNTs in RFP-SWNT is in a chemically oxidized acidic state, based on the results of Bower et al. ((1998) *Chem. Phys. Lett.* 288, 481). Of the functional groups responsible for such sites, —COOH and phenolic —OH groups are reactive with isocyanates, including isocyanic acid. The reaction of isocyanic acid with these groups and subsequent addition reactions to generate polyisocyanate appendages are shown schematically in FIG. 3.

High molecular weight polyisocyanates were first reported in 1959 and represent the simplest type of nylon (nylon-1) (Bur et al. (1976) *Chem. Rev.* 76, 727). Another possible reaction shown in FIG. 3 is the ring opening of epoxide groups by ammonia to generate amine and alcohol groups, which then react with isocyanic acid. Lu et al. (2002) (*J. Phys. Chem.* B 106, 2136) recently proposed using the ring-opening step as a way to functionalize the sidewalls of single-walled CNTs. It should be noted that polymer chain branching and cross-linking reactions are also possible, since the H-atoms bonded to the N-atoms of the linear chains are expected to be reactive with isocyanic acid.

The growth of polyisocyanate on the RFP-SWNTs could account for the water-solubility of the product as well as the dissociation of nanotube bundles into individual tubes, as is indicated by the AFM images. The discrete round-shaped bodies seen attached in a pearl chain-like manner to the CNTs in the AFM images are presumably the polymers. The sizes of the bodies of several nanometers suggest polymer molecular weights of the order of 10,000.

Since the CNTs in the RFP-SWNT material are expected to occur in bundles, the growth of polyisocyanate uniformly along the nanotubes, as the AFM results suggest, indicates that dissociation of the bundles occurred at an early stage of the reaction. This surprising result implicates the tendency of urea to form inclusion compounds. Although the channel in the usual inclusion compounds between urea and hydrocarbons are much too small to accommodate CNTs, the transient formation of larger cages should be considered. Urea is also widely used for denaturing proteins, which involves the disruption of non-covalent bonds within proteins, including van der Waals interactions. Since van der Waals interactions are important for the bundling of CNTs, the ability of urea to cause dissociation may be related to its ability to de-nature proteins.

EXAMPLE 4

Chromatography Over Sephadex® G-100

A 250-µL aliquot of the centrifuged solution from Example 1 was applied to a small column (10×80 mm) of Sephadex® G-100 swollen in water. After entering the column bed, the solution was eluted with water. Once the eluting solution became colored (black-brown), 1.1 mL was collected: this solution is referred to below as Solution B1. The next 1.5 mL (yellow colored) was also collected and is referred to as Solution B2. A black-brown band remained at the top (~5 mm) of the column and could not be washed out with water. The UV-visible absorption spectra of these two solutions are shown in FIG. 4. The spectrum of Solution B1 (after dilution with water by a factor of 2.5) is characterized by a maximum at 235 nm and a tailing absorption to beyond 1000 mm (FIG. 4, continuous curve), weak but distinct inflections occur in the wavelength region 400-500 nm. The spectrum of Solution B2 (FIG. 4, dashed curve) is characterized by a slightly structured absorption in the wavelength region 400-500 nm and almost no absorption beyond 700 nm. There is no obvious maximum in the UV region. Despite this difference in absorption spectral characteristics, both solutions have a yellow emission with a maximum near 515 nm (FIG. 5). The emission from Solution B2 is 4 times more intense than that from B1, despite that fact that the absorbance of B1 is 4.5 times greater than the absorbance of B2 at the excitation wavelength (410 nm). Thus it can be concluded that two (or more) components contribute to the absorption and emission properties of Solution B1. One contribution is due to the characteristics of functionalized CNTs (plasmon absorption maximum below 250 nm, structure-less absorption tail into the near infrared, and little or no emission). The other contribution is due to a component that is also present in Solution B2 with a yellow emission maximum 515 nm. This component is likely to be responsible for absorption between 400 nm and 500 nm in both solutions. It is a product of the reaction between the RFP-SWNT and molten urea and appears to be the component that makes the CNTs soluble in water.

EXAMPLE 5

Modification of CNTs Using Urea Melt

RFP-SWNT (12.6 mg) was pulverized with urea (504 mg) in a glass test tube as described in Example 1. The powdered mixture was heated with a heat gun source as in Example 1 for 7.5 minutes, cooled, mixed with water (800 µL) water, and centrifuged (5000 rpm for 10 min). The resulting solution, referred to below as Solution C, had a pH of 9.6. A small volume (10 µl) of the solution was diluted with water (1000 µl) in a quartz cuvette and the UV-visible absorption spectrum was recorded. The spectrum, shown in FIG. 6 (dashed curve), has a tailing absorption to beyond 1000 nm. No maximum is apparent in the UV region due to absorption by urea and by-products of the reaction.

EXAMPLE 6

Chromatography Over Sephadex® G-10

A 500-µL aliquot of the centrifuged solution from Example 5 was applied to a small column (10×52 mm) of Sephadex® G-10 swollen in water. After entering the column bed, the solution was eluted with water. Once the eluting solution became colored (black-brown), 1.0 mL was collected: this solution is referred to below as Solution D1. The next 0.9 mL (black-brown colored) was also collected and is referred to as Solution D2. A light gray band remained at the top (~11 mm) of the column and could not be washed out with water. The UV-visible absorption spectrum of Solution D1 (after dilution with water by a factor of 25) is characterized by a maximum at 220 nm and a tailing absorption to beyond 1000 nm (FIG. 6, continuous curve). The diluted Solution D1 is characterized by a yellow emission with a maximum near 515 nm (FIG. 7, continuous curve).

EXAMPLE 7

Isolation of Modified CNTs by Precipitation with Sodium Perchlorate

Sodium perchlorate monohydrate (115 mg) was added to Solution D2 from Example 6, and then mixed until the crystals dissolved, giving a concentration of $NaClO_4$ of ~1.0 M. The solution became opalescent within minutes. After being left overnight, a black precipitate settled out leaving clear yellow-brown supernatant, which emitted yellow-white light when excited with UV (366 nm) light. After removing the supernatant, the precipitate was readily redissolved in 500 µL of water (Solution E). The UV-visible absorption spectrum of Solution E (after dilution with water by a factor of 20) is characterized by a maximum at 242 nm and a tailing absorption to beyond 1000 nm (FIG. 6, dash-dotted curve). The diluted solution is also characterized by a weak yellow emission whose maximum is near 550 nm (FIG. 7, dash-dotted curve). Sodium perchlorate monohydrate (115 mg) was added to Solution E, and then mixed until the crystals dissolved, giving a concentration of $NaClO_4$ of ~0.25 M. The solution became opalescent within minutes. After 30 minutes, it was centrifuged at 5000 rpm for 10 minutes, yielding a black precipitate and, clear colorless supernatant. After removing the supernatant, the precipitate was dried under a gentle stream of compressed air. The resulting solid, having a mass of 0.47 mg, redissolved in 10 µL of water after bath sonication for 1 minute.

EXAMPLE 8

Preparation of SWNTs Modified by Molten Urea Alone

Herein Referred to as "U-SWNTs"

A portion of RFP-SWNT (2.51 mg) was placed in a glass test tube (Schott Duran®, 12×100 mm) and pulverized with a glass stirring-rod (5 mm diameter). Urea (100 mg) was added and thoroughly pulverized with the RFP-SWNT to yield a gray powder. The powder was heated by clamping the test tube vertically over the exit port of a heat gun (Steinel Type 3458, 2000 W) that was set to have a maximum temperature at the exit of 150° C. The powder melted to give a black liquid, which was kept agitated by hand using a stirring-rod. After 8 minutes of heating, the mixture was cooled to room temperature. The soluble material was extracted into water (600 µl) by vortex mixing, and the resultant suspension was centrifuged at 5000 rpm for 10 minutes to give a clear, mildly basic (pH 9.6) supernatant A portion (45 µl) of the supernatant solution was diluted with water (1000 µl) in order to measure the UV-visible absorption spectrum for estimation of the concentration. Based on the absorbance at 800 nm (0.093) and the dilution factor, the concentration of nanotubes in the supernatant was approximately 110 mg $l^{-1}$. The estimated mass of nanotubes in the supernatant was thus approximately 0.07 mg, or roughly 3% of the mass of RFP-SWNT used in the reaction. The U-SWNT was precipitated from the remaining supernatant, after removing the undissolved material, by adding sodium perchlorate monohydrate (20.8 mg). Centrifugation (3000 rpm for 5 minutes) gave a black precipitate and clear yellow supernatant. The UV-visible absorption spectrum of the supernatant, after dilution, exhibits some structure and tails to around 800 nm. The supernatant solutions have a yellow-green emission under 366-nm light. The precipitate dissolved readily in water. This preparation is summarized in Table 2.

Preparation of SWNTs Modified by Molten Urea with Addition of an Aldehyde, e.g. p-anisaldehyde (Herein Referred to as "UA-SWNTs".)

Two preparations of UA-SWNT are summarized in Table 2. One preparation was on a scale similar to that of the U-SWNT preparation described above and the other preparation was scaled up approximately ten-fold. In the latter case, an agate mortar and pestle was used to grind the RFP-SWNT and urea, and a larger glass test tube (Schott Duran®, 17×170 mm) was used as the reaction vessel. In both cases, the mixture of RFP-SWNT and urea was heated to approximately 150° C. for 1-2 minutes until it had thoroughly liquefied. For the smaller scale reaction, heating was for 1 minute. For the larger scale reaction, 2 minutes heating was required until the mixture was completely molten. Then the heating was stopped, p-anisaldehyde was added, and heating was continued for an additional 7 minutes. The resultant solid, after cooling to room temperature, was subjected to multiple extractions, first with water and later with methanol. Each extraction step typically involved vortex mixing, at least 30 minutes wait, and brief (1 minute) bath ultrasonication before centrifuging the suspension (5000 rpm for 10 min). The extractions with water removed the excess urea and other water-soluble components, including ca 20-30% of the excess p-anisaldehyde, whose solubility in water is ca 0.015 M. The extracts also contained the yellow colored component noted above. As indicated in Table 2, the concentration of nanotubes in the initial extract(s) with methanol was relatively low. The concentrations of subsequent extracts increased and then decreased, presumably due to depletion of soluble material from the remaining solid. The UA-SWNTs in the methanol extracts of the larger scale preparation were isolated by precipitation with sodium perchlorate monohydrate (4-9 mg per ml). The precipitates were dissolved in methanol after washing. These samples were apparently much more sensitive to salt concentration than those of U-SWNT in water because the precipitates did not dissolve the first time they were suspended in methanol (1 ml). After centrifuging and removing the supernatant, the precipitates were mostly soluble in methanol (1 ml). Apparently, it was necessary to remove traces of sodium perchlorate with methanol before the nanotubes became soluble. The concentration of nanotubes in the next to the last methanol extract (step 11 in table 2) was 980 mg l$^{-1}$, indicating solubility up to 1 g l$^{-1}$ for UA-SWNTs in methanol. These nanotubes are also quite soluble in water.

Estimation of the solubility of U-SWNTs in water. U-SWNTs were prepared as described above. The aqueous extract (0.5 ml) was applied to a column (10×52 mm) of Sephadex G-10 and eluted with water. The first 1.0 ml containing nanotubes that eluted from the column was collected and determined by UV-visible absorption to contain 100 mg l$^{-1}$ U-SWNTs.

The solution was evaporated to dryness with compressed dry air. The resulting solid dissolved within seconds upon addition of a 10-μl drop of water, indicating solubility up to 10 g l$^{-1}$. The solution is too darkly colored to see whether the solid was completely dissolved, but no solid was deposited onto the wall of the container when the solution was shaken vigorously.

TABLE 2

Summary of preparations of U-SWNT and UA-SWNT.

| RFP-SWNT (mg) | Urea (mg) | Aldehyde (μl) | Vol., Conc. H$_2$O extracts (ml, mg l$^{-1}$) | Vol., Conc. MeOH extracts (ml, mg l$^{-1}$) | Total mass extracted (mg) | Yield (%) |
|---|---|---|---|---|---|---|
| 2.51 | 100 | | 0.6, 110 | | 0.07 | 3 |
| 2.74 | 110 | 20 | 1) 1.0, <1 | 5) 1.0, 40 | 0.94 | 34 |
| | | | 2) 0.5, <1 | 6) 1.1, 380 | | |
| | | | 3) 0.5, <2 | 7) 1.0, 210 | | |
| | | | 4) 0.5, 10 | 8) 1.0, 160 | | |
| | | | | 9) 1.0, 60 | | |
| | | | | 10) 1.0, 50 | | |
| 34.0 | 1370 | 250 | 1) 1.5, 10 | 7) 4.0, 30 | 10.5 | 31 |
| | | | 2) 9.0, 10 | 8) 4.0, 10 | | |
| | | | 3) 3.0, 70 | 9) 4.5, 720 | | |
| | | | 4) 3.0, 190 | 10) 4.4, 710 | | |
| | | | 5) 3.0, 100 | 11) 4.4, 460 | | |
| | | | 6) 3.0, 130 | 12) 4.1, 100 | | |

Without wishing to be bound by any theory, the scenario that is envisaged by the present inventors is the intercalation of the CNT bundles by urea, urea decomposition, addition reactions between the decomposition products and oxidized carbon groups on the CNTs, and polymer growth from those sites. These processes may begin with the mixing, e.g. the grinding together of the CNTs and urea, which may also result in mechanical cutting of the CNTs.

The procedure described in this report of invention has several of the characteristics that were listed above for the ideal procedure:
1. It is relatively simple and fast
2. It yields isolated CNTs that dissolve in water.
3. It is applicable for CNTs that have not been shortened.
4. It provides soluble CNTs with functional groups for subsequent chemical modification.

Further, the procedure is applicable for multi-walled CNTs. It is also clear that suitable chemical modifications, introduced either during the reaction or afterwards, are possible for making the CNTs soluble in a variety of organic solvents. It may be impossible to perform such reactions without altering the electronic and/or mechanical properties of the CNTs, but it may be possible to restore them finally by thermal treatment under vacuum or inert atmosphere. None of the state of the art procedures offer this combination of features.

The features disclosed in the foregoing description and the claims may, both separately and in any combination thereof be material for realizing the invention in diverse forms thereof.

LIST OF REFERENCES CITED IN TABLE 1

[1] Tohji, K-; Takahashi, H.; Shinoda, Y.; Shimizu, N.; Jeyadevan, B.; Matsuoka, I.; Saito, Y.; Kasuya, A.; Ito, S.; Nishina, Y. (1997) *J. Phys. Chem. B* 101, 1974.

[2] Bandow, S.; Rao, A. M.; Williams, K. A.; Thess, A. Smalley, R E., Eklund, P. C. (1997) *J. Phys. Chem. B* 101, 8839.

[3] Dujardin, E.; Ebbesen, T. W.; Krishnan, A.; Treacy, M. M. J. (1998) *Adv. Mater.* 10, 611.

[4] Liu, J.; Rinzler, A. G.; Dai, H.; Hafner, J. H.; Kelley Bradley, R.; Boul, P. J.; Lu, A.; Iverson, T.; Shelimov, K.; Huffman, C. B.; Rodriguez-Macias, F.; Shon, Y.-S.; Lee, T. R.; Colbert, D. T.; Smalley, R. E. (1998) *Science* 280, 1253.

[5] Zimmerman, J. L; Kelley Bradley, R.; Huffman, C. B.; Hauge, R. H.; Margrave, J. L. (2000) *Chem. Mater.* 12, 1361.

[6] Tang, X.-P.; Kleinhammes, A.; Shimoda, H.; Fleming, L; Bennoune, K. Y.; Sinha, S.; Bower, C.; Zhou, O.; Wu, Y. (2000) *Science* 288, 492.

[7] Rao, C. N.; Govindaraj, A. (2001) *Proc. Indian Acad. Sci. (Chem. Sci.)* 113, 375.

[8] Chattopadhyay, D.; Galeska, I.; Papadimitrakopoulos, F. (2002) *Carbon* 40, 985.

[9] Harutyunyan, A. R.; Pradhan, B. K.; Chang, J.; Chen, G., Eklund, P. C. (2002) *J. Phys. Chem. B* 106, 8671.

[10] Kajiura, H.; Tsutsui, S.; Huang, H.; Murakami, Y. (2002) *Chem. Phys. Lett.* 364, 586.

The invention claimed is:

1. A non-bundled carbon nanotube produced by a process comprising:
   a) providing, in any order: bundled carbon nanotubes, and urea as a precursor of isocyanic acid and/or cyanate ion, said isocyanic acid and/or cyanate ion being capable of undergoing a polymerization reaction;

b) mixing together the bundled carbon nanotubes with urea to produce a mixture, wherein said mixing further comprises:

heating the mixture, or alternatively, acidifying the mixture, or both heating and acidifying the mixture, wherein the heating and/or acidifying induces urea to form isocyanic acid and/or cyanate ion, and wherein at least one aldehyde is added to the mixture during the heating and/or acidification; and c) initiating a polymerization reaction of the isocyanic acid and/or cyanate ion to produce non-bundled carbon nanotubes, wherein the at least one aldehyde is added to the mixture before, and optionally during or after, initiating the polymerization reaction, wherein the non-bundled carbon nanotubes have functional groups comprising aldehyde groups on their surface and/or ends, wherein said polymerization reaction occurs at said functional groups, and wherein the non-bundled carbon nanotubes have a solubility in water or aqueous solution of up to approximately 10 g/L, and a solubility in methanol or methanolic solution of up to approximately 1 g/L.

2. The non-bundled carbon nanotube according to claim 1, which is decorated in a pearl chain-like manner with discrete bodies, when viewed by AFM.

3. An association of the non-bundled carbon nanotubes according to claim 2, wherein the non-bundled carbon nanotubes are interconnected at their ends through said discrete bodies into branched structures, when viewed by AFM.

4. The non-bundled carbon nanotube according to claim 1, having one or more physical characteristics selected from the group consisting of:

an absorption maximum between 210 nm and 250 nm, and one or more of the following absorption maxima in the infrared in the following wavenumber regions: 3470-3490 $cm^{-1}$, 3420-3440 $cm^{-1}$, 3365-3385 $cm^{-1}$, 3330-3350 $cm^{-1}$, 3245-3265 $cm^{-1}$, 3210-3230 $cm^{-1}$, 1660-1680 $cm^{-1}$, 1610-1630 $cm^{-1}$, 1450-1470 $cm^{-1}$, 1330-1350 $cm^{-1}$ and 1095-1115 $cm^{-1}$.

5. A product comprising the non-bundled a carbon nanotube according to claim 1, wherein the product is selected from the group consisting of an electronic device, a nanoelectronic device, a memory element, a field emission device, a sensor, an actuator, an electromechanical device, a composite material, a coating/paint/paste, a hydrogen storage device, a battery or fuel cell, a supercapacitor, a photoelectrochemical device, a photovoltaic device, an energy conversion device, a light emitting diode, a liquid crystal display, a probe scanning probe microscopy, a non-linear optical device or antenna, and a catalyst.

6. A non-bundled carbon nanotube or an association of non-bundled carbon nanotubes produced by a process comprising:

a) providing, in any order: bundled carbon nanotubes, and urea;

b) mixing together the bundled carbon nanotubes with urea to produce a mixture, wherein at least one aldehyde is added to the mixture;

c) heating the mixture for approximately 1-60 min to produce the non-bundled carbon nanotube or association of non-bundled carbon nanotubes having functional groups comprising aldehyde groups on their surface and/or ends, wherein the at least one aldehyde is added to the mixture before, and optionally during or after, initiating the heating, wherein the non-bundled carbon nanotube or association of non-bundled carbon nanotubes is dissolved in an aqueous or alcoholic solution, or a mixture thereof, and subjected to one or more of the following: salt precipitation optionally followed by washing; centrifugation or filtration optionally followed by washing; size separation; adsorption; enzymatic degradation; selective burning; plasma treatment; and evaporation, and wherein the non-bundled carbon nanotube or association of non-bundled carbon nanotubes have a solubility in water or aqueous solution of up to approximately 10 g/L, and a solubility in methanol or methanolic solution of up to approximately 1 g/L.

7. The carbon nanotube or association of carbon nanotubes according to claim 6, which is at least partially crystalline.

8. The carbon nanotube or association of carbon nanotubes according to claim 6, having one or more physical characteristics selected from the group consisting of:

one or more of the following absorption maxima in the infrared in the following wavenumber regions: 3370-3390 $cm^{-1}$, 3205-3225 $cm^{-1}$, 3060-3080 $cm^{-1}$, 1700-1720 $cm^{-1}$, 1680-1700 $cm^{-1}$, 1655-1675 $cm^{-1}$, 1580-1600 $cm^{-1}$, 1500-1520 $cm^{-1}$, 1440-1460 $cm^{-1}$, 1395-1415 $cm^{-1}$, 1245-1265 $cm^{-1}$, 1155-1175 $cm^{-1}$, 1020-1040 $cm^{-1}$, 845-865 $cm^{-1}$, 795-815 $cm^{-1}$, and having both crystalline and amorphous parts, when viewed under AFM, TEM and/or SEM.

9. A product comprising the non-bundled carbon nanotube or association of non-bundled carbon nanotubes according to claim 6, wherein the product is selected from the group consisting of an electronic device, a nanoelectronic device, a memory element, a field emission device, a sensor, an actuator, an electromechanical device, a composite material, a coating/paint/paste, a hydrogen storage device, a battery or fuel cell, a supercapacitor, a photoelectrochemical device, a photovoltaic device, an energy conversion device, a light emitting diode, a liquid crystal display, a probe scanning probe microscopy, a non-linear optical device or antenna, and a catalyst.

* * * * *

UNITED STATES PATENT AND TRADEMARK OFFICE
CERTIFICATE OF CORRECTION

PATENT NO.         : 7,854,914 B2                                    Page 1 of 1
APPLICATION NO.    : 12/404095
DATED              : December 21, 2010
INVENTOR(S)        : William E. Ford et al.

It is certified that error appears in the above-identified patent and that said Letters Patent is hereby corrected as shown below:

Column 8, Line 14, "ferrocene carboxaldehyde, formaldehyde, feral, glutaralde-" should read --ferrocene carboxaldehyde, formaldehyde, furfural, glutaralde- --

Signed and Sealed this

Twenty-sixth Day of April, 2011

David J. Kappos
*Director of the United States Patent and Trademark Office*